US008851979B2

(12) United States Patent
Basallo et al.

(10) Patent No.: US 8,851,979 B2
(45) Date of Patent: *Oct. 7, 2014

(54) GAMING SYSTEM AND METHOD FOR PROVIDING A SYMBOL ELIMINATION GAME

(71) Applicant: IGT, Reno, NV (US)

(72) Inventors: Leandro Basallo, San Francisco, CA (US); Scott A. Caputo, Santa Clara, CA (US)

(73) Assignee: IGT, Las Vegas, NV (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/789,045

(22) Filed: Mar. 7, 2013

(65) Prior Publication Data

US 2014/0256406 A1 Sep. 11, 2014

(51) Int. Cl.

*A63F 13/00* (2014.01)
*G07F 17/32* (2006.01)

(52) U.S. Cl.

CPC .................................... *G07F 17/326* (2013.01)
USPC ................... 463/25; 463/16; 463/20; 463/26; 463/42; 463/43

(58) Field of Classification Search

USPC ................. 463/11–13, 16–21, 25–27, 29, 31, 463/39–43
See application file for complete search history.

(56) References Cited

U.S. PATENT DOCUMENTS

| | | | |
|---|---|---|---|
| 2,077,124 | A | 4/1937 | Miller et al. |
| 2,476,580 | A | 7/1949 | Bergman |
| 2,585,268 | A | 2/1952 | Olsen |
| 3,309,092 | A | 3/1967 | Hardesty |
| 3,420,525 | A | 1/1969 | Waders |
| 3,533,629 | A | 10/1970 | Raven |
| 3,580,581 | A | 5/1971 | Raven |
| 3,642,287 | A | 2/1972 | Lally et al. |
| 3,645,531 | A | 2/1972 | Wright |
| 3,695,615 | A | 10/1972 | Shoptaugh |
| 3,735,987 | A | 5/1973 | Ohki |
| 3,770,269 | A | 11/1973 | Elder |
| 3,834,712 | A | 9/1974 | Cox |
| 3,937,565 | A | 2/1976 | Alasia |
| 4,092,654 | A | 5/1978 | Alasia |
| 4,099,722 | A | 7/1978 | Rodesch et al. |
| 4,180,271 | A | 12/1979 | McMurchie |

(Continued)

FOREIGN PATENT DOCUMENTS

| | | |
|---|---|---|
| AU | 5032796 | 10/1997 |
| AU | 6355398 | 10/1998 |

(Continued)

*Primary Examiner* — Sunit Pandya
(74) *Attorney, Agent, or Firm* — Neal, Gerber & Eisenberg LLP

(57) ABSTRACT

In various embodiments, the gaming system disclosed herein provides a symbol elimination game which utilizes a single continuous series or chain of symbols displayed at a plurality of symbol display positions of a formed path and further utilizes one or more eliminators displayed at one or more eliminator display positions associated with and distinct from the symbol display positions of the formed path. Specifically, in various embodiments, the gaming system: (i) displays the chain of symbols continuously moving through the path of symbol display positions, and (ii) eliminates zero, one or more of such symbols based on one or more interactions between such symbols and the symbol display eliminators displayed at the eliminator display positions.

26 Claims, 14 Drawing Sheets

(56) References Cited

U.S. PATENT DOCUMENTS 4,184,683 A 1/1980 Hooker
4,190,256 A 2/1980 Rudden, Jr.
4,198,052 A 4/1980 Gauselmann
4,200,291 A 4/1980 Hooker
4,326,351 A 4/1982 Heywood et al.
4,346,900 A 8/1982 Lamlee
4,448,419 A 5/1984 Telnaes
4,492,378 A 1/1985 Williams
4,508,345 A 4/1985 Okada
4,582,324 A 4/1986 Koza et al.
4,593,904 A 6/1986 Graves
4,614,344 A 9/1986 O'Connor
4,624,459 A 11/1986 Kaufman
4,636,951 A 1/1987 Harlick
4,648,600 A 3/1987 Olliges
4,669,731 A 6/1987 Clarke
4,695,053 A 9/1987 Vazquez, Jr. et al.
4,712,799 A 12/1987 Fraley
4,790,537 A 12/1988 Smyth et al.
4,826,169 A 5/1989 Bessho et al.
4,836,546 A 6/1989 DiRe et al.
4,838,552 A 6/1989 Hagiwara
4,874,173 A 10/1989 Kishishita
4,991,848 A 2/1991 Greenwood et al.
5,042,809 A 8/1991 Richardson
5,046,736 A 9/1991 Bridgeman et al.
5,085,436 A 2/1992 Bennett
5,092,598 A 3/1992 Kamille
5,100,137 A 3/1992 Fulton
5,102,134 A 4/1992 Smyth
5,102,137 A 4/1992 Ekiert
5,116,055 A 5/1992 Tracy
5,127,651 A 7/1992 Okada
5,152,529 A 10/1992 Okada
5,163,131 A 11/1992 Row et al.
5,167,413 A 12/1992 Fulton
5,178,390 A 1/1993 Okada
5,184,821 A 2/1993 Korenek
5,188,363 A 2/1993 Marnell, II et al.
5,205,555 A 4/1993 Hamano
RE34,244 E 5/1993 Hagiwara
5,209,479 A 5/1993 Nagao et al.
5,251,897 A 10/1993 Fulton
5,259,616 A 11/1993 Bergmann
5,265,877 A 11/1993 Boylan et al.
5,277,424 A 1/1994 Wilms
5,292,127 A 3/1994 Kelly et al.
5,324,040 A 6/1994 Panda
5,342,035 A 8/1994 Sugiyama et al.
5,342,047 A 8/1994 Heidel et al.
5,342,049 A 8/1994 Wichinsky et al.
5,344,144 A 9/1994 Canon
5,364,100 A 11/1994 Ludlow et al.
5,373,440 A 12/1994 Cohen et al.
5,393,061 A 2/1995 Manship et al.
5,395,111 A 3/1995 Inoue
5,397,125 A 3/1995 Adams
5,401,024 A 3/1995 Simunek
5,423,539 A 6/1995 Nagao
5,437,451 A 8/1995 Fulton
5,449,173 A 9/1995 Thomas et al.
5,456,465 A 10/1995 Durham
5,472,196 A 12/1995 Rusnak
5,511,781 A 4/1996 Wood et al.
5,524,888 A 6/1996 Heidel
5,536,016 A 7/1996 Thompson
5,553,851 A 9/1996 Malavazos et al.
5,560,603 A 10/1996 Seelig et al.
5,564,700 A 10/1996 Celona
5,569,084 A 10/1996 Nicastro et al.
5,580,053 A 12/1996 Crouch
5,580,055 A 12/1996 Hagiwara
5,580,309 A 12/1996 Piechowiak et al.
5,584,763 A 12/1996 Kelly et al.
5,584,764 A 12/1996 Inoue
5,609,524 A 3/1997 Inoue
5,611,535 A 3/1997 Tiberio
5,624,119 A 4/1997 Leake
5,630,586 A 5/1997 Lowden
5,639,089 A 6/1997 Matsumoto et al.
5,645,485 A 7/1997 Clapper, Jr.
5,647,798 A 7/1997 Falciglia
5,655,965 A 8/1997 Takemoto et al.
5,695,402 A 12/1997 Stupak
5,697,843 A 12/1997 Manship et al.
5,704,835 A 1/1998 Dietz, II
5,711,525 A 1/1998 Breeding
5,720,662 A 2/1998 Holmes, Jr. et al.
5,722,891 A 3/1998 Inoue
5,732,948 A 3/1998 Yoseloff
5,743,526 A 4/1998 Inoue
5,743,799 A 4/1998 Houriet et al.
5,752,881 A 5/1998 Inoue
5,755,619 A 5/1998 Matsumoto et al.
5,766,074 A 6/1998 Cannon et al.
5,769,458 A 6/1998 Carides et al.
5,769,716 A 6/1998 Saffari et al.
5,775,692 A 7/1998 Watts et al.
5,779,544 A 7/1998 Seelig et al.
5,779,549 A 7/1998 Walker et al.
5,788,573 A 8/1998 Baerlocher et al.
5,791,989 A 8/1998 Slinkman
5,807,172 A 9/1998 Piechowiak
5,813,911 A 9/1998 Margolin
5,816,916 A 10/1998 Moody
5,817,172 A 10/1998 Yamada et al.
5,823,873 A 10/1998 Moody
5,823,874 A 10/1998 Adams
5,833,536 A 11/1998 Davids et al.
5,833,537 A 11/1998 Barrie
5,848,932 A 12/1998 Adams
5,851,010 A 12/1998 Feinberg
5,851,148 A 12/1998 Brune et al.
5,855,514 A 1/1999 Kamille
5,868,392 A 2/1999 Kraft
5,879,235 A 3/1999 Kaneko et al.
5,882,258 A 3/1999 Kelly et al.
5,882,259 A 3/1999 Holmes, Jr. et al.
5,882,260 A 3/1999 Marks et al.
5,882,261 A 3/1999 Adams
5,885,158 A 3/1999 Torango et al.
5,910,048 A 6/1999 Feinberg
5,911,418 A 6/1999 Adams
5,919,088 A 7/1999 Weiss
5,931,467 A 8/1999 Kamille
5,935,002 A 8/1999 Falciglia
5,947,820 A 9/1999 Morro et al.
5,951,397 A 9/1999 Dickinson
5,954,335 A 9/1999 Moody
5,967,893 A 10/1999 Lawrence et al.
5,971,849 A 10/1999 Falciglia
5,976,016 A 11/1999 Moody et al.
5,980,384 A 11/1999 Barrie
5,984,781 A 11/1999 Sunaga
5,984,782 A 11/1999 Inoue
5,993,316 A 11/1999 Coyle et al.
5,996,997 A 12/1999 Kamille
5,997,400 A 12/1999 Seelig et al.
5,997,401 A 12/1999 Crawford
6,004,207 A 12/1999 Wilson, Jr. et al.
6,012,982 A 1/2000 Piechowialt et al.
6,012,983 A 1/2000 Walker et al.
6,015,344 A 1/2000 Kelly et al.
6,015,346 A 1/2000 Bennett
6,019,374 A 2/2000 Breeding
6,027,115 A 2/2000 Griswold et al.
6,033,307 A 3/2000 Vancura
6,039,646 A 3/2000 Sells
6,045,129 A 4/2000 Cooper
6,047,963 A 4/2000 Pierce et al.
6,050,895 A 4/2000 Luciano et al.
6,053,813 A 4/2000 Mathis
6,056,642 A 5/2000 Bennett
6,059,289 A 5/2000 Vancura

(56) References Cited

U.S. PATENT DOCUMENTS

| | | | |
|---|---|---|---|
| 6,059,658 | A | 5/2000 | Mangano et al. |
| 6,062,980 | A | 5/2000 | Luciano |
| 6,077,163 | A | 6/2000 | Walker et al. |
| 6,082,734 | A | 7/2000 | Uehara et al. |
| 6,086,066 | A | 7/2000 | Takeuchi et al. |
| 6,089,976 | A | 7/2000 | Schneider et al. |
| 6,089,977 | A | 7/2000 | Bennett |
| 6,089,978 | A | 7/2000 | Adams |
| 6,093,102 | A | 7/2000 | Bennett |
| 6,095,921 | A | 8/2000 | Walker et al. |
| 6,102,400 | A | 8/2000 | Scott et al. |
| 6,102,798 | A | 8/2000 | Bennett |
| 6,105,962 | A | 8/2000 | Malavazos et al. |
| 6,110,041 | A | 8/2000 | Walker et al. |
| 6,110,043 | A | 8/2000 | Olsen |
| 6,113,098 | A | 9/2000 | Adams |
| 6,117,009 | A | 9/2000 | Yoseloff |
| 6,117,013 | A | 9/2000 | Eiba |
| 6,120,031 | A | 9/2000 | Adams |
| 6,120,377 | A | 9/2000 | McGinnis et al. |
| 6,120,378 | A | 9/2000 | Moody et al. |
| 6,126,542 | A | 10/2000 | Fier |
| 6,129,632 | A | 10/2000 | Luciano |
| 6,135,885 | A | 10/2000 | Lermusiaux |
| 6,142,873 | A | 11/2000 | Weiss et al. |
| 6,142,874 | A | 11/2000 | Kodachi et al. |
| 6,142,875 | A | 11/2000 | Kodachi et al. |
| 6,146,273 | A | 11/2000 | Olsen |
| 6,149,156 | A | 11/2000 | Feola |
| 6,149,521 | A | 11/2000 | Sanduski |
| 6,155,925 | A | 12/2000 | Giobbi et al. |
| 6,158,741 | A | 12/2000 | Koelling |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,162,121 | A | 12/2000 | Morro et al. |
| 6,168,520 | B1 | 1/2001 | Baerlocher et al. |
| 6,168,522 | B1 | 1/2001 | Walker et al. |
| 6,168,523 | B1 | 1/2001 | Piechowiak et al. |
| 6,173,955 | B1 | 1/2001 | Perrie et al. |
| 6,174,233 | B1 | 1/2001 | Sunaga et al. |
| 6,174,235 | B1 | 1/2001 | Walker et al. |
| 6,186,894 | B1 | 2/2001 | Mayeroff |
| 6,190,254 | B1 | 2/2001 | Bennett |
| 6,190,255 | B1 | 2/2001 | Thomas et al. |
| 6,203,429 | B1 | 3/2001 | Demar et al. |
| 6,210,276 | B1 | 4/2001 | Mullins |
| 6,210,277 | B1 | 4/2001 | Stefan |
| 6,213,877 | B1 | 4/2001 | Walker et al. |
| 6,217,448 | B1 | 4/2001 | Olsen |
| 6,220,959 | B1 | 4/2001 | Holmes et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,969 | B1 | 5/2001 | Yoseloff |
| 6,227,971 | B1 | 5/2001 | Weiss |
| 6,231,442 | B1 | 5/2001 | Mayeroff |
| 6,231,445 | B1 | 5/2001 | Acres |
| 6,234,879 | B1 | 5/2001 | Hasegawa et al. |
| 6,234,897 | B1 | 5/2001 | Frohm et al. |
| 6,237,913 | B1 | 5/2001 | Kamille |
| 6,238,287 | B1 | 5/2001 | Komori et al. |
| 6,238,288 | B1 | 5/2001 | Walker et al. |
| 6,241,607 | B1 | 6/2001 | Payne et al. |
| 6,244,957 | B1 | 6/2001 | Walker et al. |
| 6,251,013 | B1 | 6/2001 | Bennett |
| 6,254,482 | B1 | 7/2001 | Walker et al. |
| 6,261,128 | B1 | 7/2001 | Heim et al. |
| 6,261,177 | B1 | 7/2001 | Bennett |
| 6,261,178 | B1 | 7/2001 | Bennett |
| 6,267,669 | B1 | 7/2001 | Luciano, Jr. et al. |
| 6,270,409 | B1 | 8/2001 | Shuster |
| 6,270,410 | B1 | 8/2001 | DeMar et al. |
| 6,270,411 | B1 | 8/2001 | Gura et al. |
| 6,270,412 | B1 | 8/2001 | Crawford et al. |
| 6,283,474 | B1 | 9/2001 | de Keller |
| 6,283,861 | B1 | 9/2001 | Kawai et al. |
| 6,287,194 | B1 | 9/2001 | Okada |
| 6,288,993 | B1 | 9/2001 | Kawahara et al. |
| 6,290,600 | B1 | 9/2001 | Glasson |
| 6,293,866 | B1 | 9/2001 | Walker et al. |
| 6,299,165 | B1 | 10/2001 | Nagano |
| 6,302,790 | B1 | 10/2001 | Brossard |
| 6,302,791 | B1 | 10/2001 | Frohm et al. |
| 6,309,298 | B1 | 10/2001 | Gerow |
| 6,309,299 | B1 | 10/2001 | Weiss |
| 6,309,300 | B1 | 10/2001 | Glavich |
| 6,311,976 | B1 | 11/2001 | Yoseloff et al. |
| 6,312,331 | B1 | 11/2001 | Tamaki |
| 6,312,334 | B1 | 11/2001 | Yoseloff |
| 6,315,660 | B1 | 11/2001 | DeMar et al. |
| 6,315,662 | B1 | 11/2001 | Jorasch et al. |
| 6,315,664 | B1 | 11/2001 | Baerlocher et al. |
| 6,319,124 | B1 | 11/2001 | Baerlocher et al. |
| 6,322,309 | B1 | 11/2001 | Thomas et al. |
| 6,328,649 | B1 | 12/2001 | Randall et al. |
| 6,331,143 | B1 | 12/2001 | Yoseloff |
| 6,334,814 | B1 | 1/2002 | Adams |
| 6,334,864 | B1 | 1/2002 | Amplatz et al. |
| 6,336,860 | B1 | 1/2002 | Webb |
| 6,336,862 | B1 | 1/2002 | Byrne |
| 6,340,158 | B2 | 1/2002 | Pierce et al. |
| 6,343,988 | B1 | 2/2002 | Walker et al. |
| 6,346,043 | B1 | 2/2002 | Colin et al. |
| 6,347,996 | B1 | 2/2002 | Gilmore et al. |
| RE37,588 | E | 3/2002 | Ornstein |
| 6,358,147 | B1 | 3/2002 | Jaffe et al. |
| 6,364,766 | B1 | 4/2002 | Anderson et al. |
| 6,364,767 | B1 | 4/2002 | Brossard et al. |
| 6,364,768 | B1 | 4/2002 | Acres et al. |
| 6,368,216 | B1 | 4/2002 | Hedrick et al. |
| 6,375,187 | B1 | 4/2002 | Baerlocher |
| 6,375,567 | B1 | 4/2002 | Acres |
| 6,375,570 | B1 | 4/2002 | Poole |
| 6,386,974 | B1 | 5/2002 | Adams |
| 6,394,902 | B1 | 5/2002 | Glavich et al. |
| 6,398,218 | B1 | 6/2002 | Vancura |
| 6,398,644 | B1 | 6/2002 | Perrie et al. |
| 6,406,369 | B1 | 6/2002 | Baerlocher et al. |
| 6,409,172 | B1 | 6/2002 | Vancura |
| 6,409,597 | B1 | 6/2002 | Mizumoto |
| 6,409,602 | B1 | 6/2002 | Wiltshire et al. |
| 6,413,160 | B1 | 7/2002 | Vancura |
| 6,413,161 | B1 | 7/2002 | Baerlocher et al. |
| 6,413,162 | B1 | 7/2002 | Baerlocher et al. |
| 6,416,408 | B2 | 7/2002 | Tracy et al. |
| 6,419,579 | B1 | 7/2002 | Bennett |
| 6,428,412 | B1 | 8/2002 | Anderson et al. |
| 6,435,502 | B2 | 8/2002 | Matos |
| 6,439,995 | B1 | 8/2002 | Hughs-Baird et al. |
| 6,443,837 | B1 | 9/2002 | Jaffe et al. |
| 6,450,883 | B1 | 9/2002 | O'Halloran |
| 6,454,651 | B1 | 9/2002 | Yoseloff |
| 6,460,856 | B2 | 10/2002 | Davies |
| 6,464,581 | B1 | 10/2002 | Yoseloff et al. |
| 6,464,582 | B1 | 10/2002 | Baerlocher et al. |
| 6,471,208 | B2 | 10/2002 | Yoseloff et al. |
| 6,481,713 | B2 | 11/2002 | Perrie et al. |
| 6,491,584 | B2 | 12/2002 | Graham et al. |
| 6,494,785 | B1 | 12/2002 | Gerrard et al. |
| 6,500,068 | B2 | 12/2002 | Walker et al. |
| 6,501,899 | B1 | 12/2002 | Marrs et al. |
| 6,506,116 | B1 | 1/2003 | Sunaga et al. |
| 6,506,118 | B1 | 1/2003 | Baerlocher et al. |
| 6,511,375 | B1 | 1/2003 | Kaminkow |
| 6,514,141 | B1 | 2/2003 | Kaminkow et al. |
| 6,517,432 | B1 | 2/2003 | Jaffe |
| 6,517,433 | B2 | 2/2003 | Loose et al. |
| 6,522,312 | B2 | 2/2003 | Ohshima et al. |
| 6,533,658 | B1 | 3/2003 | Walker et al. |
| 6,533,660 | B2 | 3/2003 | Seelig et al. |
| 6,537,152 | B2 | 3/2003 | Seelig et al. |
| 6,547,242 | B1 | 4/2003 | Sugiyama et al. |

(56) References Cited

U.S. PATENT DOCUMENTS 6,551,187 B1 4/2003 Jaffe
6,554,703 B1 4/2003 Bussick et al.
6,558,254 B2 5/2003 Baerlocher et al.
6,561,899 B2 5/2003 Vancura
6,561,900 B1 5/2003 Baerlocher et al.
6,561,904 B2 5/2003 Loche et al.
6,565,433 B1 5/2003 Baerlocher et al.
6,569,016 B1 5/2003 Baerlocher
6,572,471 B1 6/2003 Bennett
6,572,472 B1 6/2003 Glavich
6,572,473 B1 6/2003 Baerlocher
6,575,830 B2 6/2003 Baerlocher et al.
6,581,935 B1 6/2003 Odom
6,582,307 B2 6/2003 Webb
6,592,457 B1 7/2003 Frohm et al.
6,595,854 B2 7/2003 Hughs-Baird et al.
6,599,187 B2 7/2003 Gerow
6,599,785 B2 7/2003 Hamada et al.
6,602,136 B1 8/2003 Baerlocher et al.
6,602,137 B2 * 8/2003 Kaminkow et al. ............. 463/16
6,604,740 B1 8/2003 Singer et al.
6,604,999 B2 8/2003 Ainsworth
6,607,438 B2 8/2003 Baerlocher et al.
6,609,791 B1 8/2003 Miyamoto et al.
6,609,971 B2 8/2003 Vancura
6,612,575 B1 9/2003 Cole et al.
6,626,758 B1 9/2003 Parham et al.
6,632,138 B1 10/2003 Serizawa et al.
6,632,139 B1 10/2003 Baerlocher
6,632,141 B2 10/2003 Webb et al.
6,634,942 B2 10/2003 Walker et al.
6,634,943 B1 10/2003 Baerlocher
6,638,164 B2 10/2003 Randall et al.
6,641,477 B1 11/2003 Dietz, II
6,645,073 B2 11/2003 Lemay et al.
6,648,754 B2 11/2003 Baerlocher et al.
6,648,758 B2 11/2003 Bennett et al.
6,666,765 B2 12/2003 Vancura
6,666,767 B1 12/2003 Dayan
6,669,559 B1 12/2003 Baerlocher et al.
6,672,960 B1 1/2004 Jensen
6,676,126 B1 1/2004 Walker et al.
6,676,512 B2 1/2004 Fong et al.
6,676,516 B2 1/2004 Baerlocher et al.
6,688,977 B1 2/2004 Baerlocher et al.
6,692,356 B2 2/2004 Baerlocher et al.
6,695,696 B1 2/2004 Kaminkow
6,702,671 B2 3/2004 Tarantino
6,702,673 B2 3/2004 Webb
6,712,693 B1 3/2004 Hettinger
6,719,630 B1 4/2004 Seelig et al.
6,722,976 B2 4/2004 Adams
6,722,981 B2 4/2004 Kaminkow et al.
6,722,982 B2 4/2004 Kaminkow et al.
6,726,562 B2 4/2004 Vancura
6,731,313 B1 5/2004 Kaminkow
6,733,386 B2 5/2004 Cuddy et al.
6,746,016 B2 6/2004 Perrie et al.
6,746,328 B2 6/2004 Cannon et al.
6,746,329 B1 6/2004 Duhamel
6,749,502 B2 6/2004 Baerlocher
6,749,504 B2 6/2004 Hughs-Baird
6,752,717 B2 6/2004 Vancura
6,761,632 B2 7/2004 Bansemer et al.
6,761,633 B2 7/2004 Riendeau et al.
6,769,983 B2 8/2004 Slomiany
6,769,986 B2 8/2004 Vancura
6,780,103 B2 8/2004 Bansemer et al.
6,780,107 B2 8/2004 Baerlocher et al.
6,783,455 B2 8/2004 Glavich
6,783,457 B2 8/2004 Hughs-Baird et al.
6,786,818 B1 9/2004 Rothschild et al.
6,786,820 B2 9/2004 Gerrard et al.
6,808,454 B2 10/2004 Gerrard et al.
6,811,482 B2 11/2004 Letovsky
6,817,944 B2 11/2004 Kaminkow et al.
6,824,465 B2 11/2004 Luciano et al.
6,840,858 B2 1/2005 Adams
6,843,722 B2 1/2005 Webb
6,843,723 B2 1/2005 Joshi
6,852,027 B2 2/2005 Kaminkow et al.
6,852,028 B2 2/2005 Vancura
6,855,053 B2 2/2005 Baerlocher
6,855,054 B2 2/2005 White et al.
6,855,055 B2 2/2005 Perrie et al.
6,863,606 B1 3/2005 Berg et al.
6,875,108 B1 4/2005 Hughs-Baird
6,878,061 B2 4/2005 Baerlocher et al.
6,893,341 B2 5/2005 Walker et al.
6,899,620 B2 5/2005 Kaminkow et al.
6,899,622 B2 5/2005 Lind et al.
6,908,383 B2 6/2005 Baerlocher et al.
6,910,962 B2 6/2005 Marks et al.
6,918,830 B2 7/2005 Baerlocher
6,918,832 B2 7/2005 Baerlocher et al.
6,918,834 B2 7/2005 Vancura
6,926,273 B1 8/2005 Vancura
6,929,545 B2 8/2005 Vancura
6,929,952 B2 8/2005 Baerlocher
6,932,701 B2 8/2005 Glavich et al.
6,935,947 B1 8/2005 Singer et al.
6,939,226 B1 9/2005 Joshi
6,939,229 B2 9/2005 McClintic
6,942,568 B2 9/2005 Baerlocher
6,958,013 B2 10/2005 Miereau et al.
6,960,133 B1 11/2005 Marks et al.
6,964,416 B2 11/2005 McClintic et al.
6,966,833 B2 11/2005 Kaminkow et al.
6,971,953 B2 12/2005 Gerrard et al.
6,981,635 B1 1/2006 Hughs-Baird et al.
6,984,174 B2 1/2006 Cannon et al.
6,986,709 B2 1/2006 Hughs-Baird et al.
6,986,711 B2 1/2006 Vancura
6,988,732 B2 1/2006 Vancura
6,988,947 B2 1/2006 Baerlocher et al.
6,988,948 B2 1/2006 Perrie et al.
6,991,539 B2 1/2006 Pacey
6,997,805 B2 2/2006 Vancura
7,037,191 B2 5/2006 Rodgers et al.
7,040,983 B2 5/2006 Dolloff et al.
7,040,984 B2 5/2006 Mead
7,056,192 B2 6/2006 Venigalla et al.
7,056,210 B2 6/2006 Bansemer et al.
7,056,214 B2 6/2006 Miereau et al.
7,059,967 B2 6/2006 Baerlocher
7,070,502 B1 7/2006 Bussick et al.
7,070,503 B2 7/2006 Rudolph
7,073,793 B2 7/2006 Vancura
7,077,744 B2 7/2006 Cannon
7,086,945 B2 8/2006 Vancura
7,104,886 B2 9/2006 Baerlocher et al.
7,104,888 B2 9/2006 Miereau et al.
7,112,136 B2 9/2006 Anderson et al.
7,112,137 B2 9/2006 Baerlocher et al.
7,121,942 B2 10/2006 Baerlocher
7,128,646 B2 10/2006 Baerlocher et al.
7,128,647 B2 10/2006 Muir
7,144,322 B2 12/2006 Gomez et al.
7,160,186 B2 1/2007 Cuddy et al.
7,160,188 B2 1/2007 Kaminkow et al.
7,172,506 B2 2/2007 Baerlocher et al.
7,175,521 B2 2/2007 McClintic
7,175,524 B2 2/2007 Bansemer et al.
7,182,689 B2 2/2007 Hughs-Baird et al.
7,192,343 B2 3/2007 Vancura
7,192,347 B1 3/2007 Marks et al.
7,217,187 B2 5/2007 Vancura
7,229,350 B2 6/2007 Baerlocher et al.
7,234,700 B2 6/2007 Vancura
7,235,011 B2 6/2007 Randall et al.
7,247,096 B2 7/2007 Vancura
7,252,591 B2 8/2007 Van Asdale
7,264,545 B2 9/2007 Maya et al.
7,273,415 B2 9/2007 Cregan et al.

(56) References Cited

U.S. PATENT DOCUMENTS 7,294,055 B2 11/2007 Baerlocher et al.
7,300,348 B2 11/2007 Kaminkow et al.
7,303,469 B2 12/2007 Kaminkow
7,314,409 B2 1/2008 Maya et al.
7,316,609 B2 1/2008 Dunn et al.
7,326,115 B2 2/2008 Baerlocher
7,335,102 B2 2/2008 Baerlocher et al.
7,338,367 B2 3/2008 Kaminkow et al.
7,338,369 B2 3/2008 Mierau et al.
7,341,512 B2 3/2008 Dolloff et al.
7,351,141 B2 4/2008 Rodgers et al.
7,357,713 B2 4/2008 Marks et al.
7,371,174 B2 5/2008 Baerlocher
7,377,849 B2 5/2008 Baerlocher et al.
7,399,226 B2 7/2008 Mishra
7,402,103 B2 7/2008 Baerlocher
7,413,510 B2 8/2008 Schlegel et al.
7,419,431 B2 9/2008 Gauselmann et al.
7,431,645 B2 10/2008 Han et al.
7,448,948 B2 11/2008 Hughs-Baird et al.
7,488,250 B2 2/2009 Baerlocher et al.
7,494,412 B2 2/2009 Baerlocher
7,541,252 B2 6/2009 Eun et al.
7,544,129 B2 6/2009 Baerlocher
7,556,561 B2 7/2009 White et al.
7,578,136 B2 8/2009 Derouineau et al.
7,578,735 B2 8/2009 Frizzell et al.
7,674,176 B2 3/2010 Berman et al.
7,708,627 B2 5/2010 Lind
7,749,068 B2 7/2010 Cuddy et al.
8,007,358 B2 8/2011 Linard et al.
8,192,272 B2 6/2012 Thomas et al.
8,221,206 B2 * 7/2012 Marks et al. .................... 463/16
8,641,505 B2 * 2/2014 Spark-Stahl et al. ........... 463/20
2001/0009865 A1 7/2001 DeMar et al.
2001/0024970 A1 9/2001 McKee et al.
2001/0038178 A1 11/2001 Vancura
2001/0040341 A1 11/2001 Kamille
2001/0041610 A1 11/2001 Luciano et al.
2002/0049084 A1 4/2002 Hughs-Baird et al.
2002/0052230 A1 5/2002 Martinek et al.
2002/0052232 A1 5/2002 Kaminkow
2002/0052233 A1 5/2002 Gauselmann
2002/0053089 A1 5/2002 Massey
2002/0058545 A1 5/2002 Luciano
2002/0077165 A1 6/2002 Bansemer et al.
2002/0077172 A1 6/2002 Uchiyama et al.
2002/0086725 A1 7/2002 Fasbender et al.
2002/0147040 A1 10/2002 Walker et al.
2002/0151350 A1 10/2002 Baerlocher et al.
2002/0151351 A1 10/2002 Baerlocher et al.
2002/0160825 A1 10/2002 Nicastro et al.
2002/0198036 A1 12/2002 Baerlocher et al.
2002/0198039 A1 12/2002 Marks et al.
2003/0013518 A1 1/2003 Graham
2003/0017868 A1 1/2003 Crawford
2003/0027623 A1 2/2003 Rose
2003/0027624 A1 2/2003 Gilmore et al.
2003/0040358 A1 2/2003 Rothkranz et al.
2003/0045345 A1 3/2003 Berman
2003/0054874 A1 3/2003 Kaminkow
2003/0054875 A1 3/2003 Marks et al.
2003/0057645 A1 3/2003 Baerlocher et al.
2003/0060267 A1 3/2003 Glavich et al.
2003/0060271 A1 3/2003 Gilmore et al.
2003/0064786 A1 4/2003 Weiss
2003/0069057 A1 4/2003 Defrees-Parrott
2003/0073480 A1 4/2003 Thomas et al.
2003/0083943 A1 5/2003 Adams et al.
2003/0087687 A1 5/2003 Locke et al.
2003/0100356 A1 5/2003 Brown et al.
2003/0119576 A1 6/2003 McClintic et al.
2003/0125107 A1 7/2003 Cannon
2003/0130024 A1 7/2003 Darby
2003/0130028 A1 7/2003 Aida et al.
2003/0153375 A1 8/2003 Vancura
2003/0157981 A1 8/2003 Marks et al.
2003/0176210 A1 9/2003 Vancura
2003/0181234 A1 9/2003 Falciglia, Sr.
2003/0186737 A1 10/2003 Bennett et al.
2003/0190942 A1 10/2003 Kaminkow et al.
2003/0190945 A1 10/2003 Bussick et al.
2003/0195028 A1 10/2003 Glavich
2003/0207710 A1 11/2003 Rodgers et al.
2003/0211881 A1 11/2003 Walker et al.
2003/0216165 A1 11/2003 Singer et al.
2004/0004112 A1 1/2004 Petruccelli
2004/0014521 A1 1/2004 Seelig et al.
2004/0018872 A1 1/2004 Baerlocher et al.
2004/0018874 A1 1/2004 Bonney et al.
2004/0033829 A1 2/2004 Pacey et al.
2004/0036212 A1 2/2004 Walker et al.
2004/0048646 A1 3/2004 Visocnik
2004/0048649 A1 3/2004 Peterson et al.
2004/0053657 A1 3/2004 Fiden et al.
2004/0053662 A1 3/2004 Pacey
2004/0053665 A1 3/2004 Baerlocher
2004/0053669 A1 3/2004 Gerrard et al.
2004/0058727 A1 3/2004 Marks et al.
2004/0063493 A1 4/2004 Baerlocher et al.
2004/0067790 A1 4/2004 Peterson et al.
2004/0082374 A1 4/2004 Maya et al.
2004/0082378 A1 4/2004 Peterson et al.
2004/0102238 A1 5/2004 Taylor
2004/0106444 A1 6/2004 Cuddy et al.
2004/0106445 A1 6/2004 Perrie et al.
2004/0137981 A1 7/2004 Gauselmann et al.
2004/0162133 A1 8/2004 Jackson
2004/0176156 A1 9/2004 Walker et al.
2004/0185927 A1 9/2004 Baerlocher et al.
2004/0192431 A1 9/2004 Singer et al.
2004/0195773 A1 10/2004 Masci et al.
2004/0204223 A1 10/2004 Cuddy et al.
2004/0217548 A1 11/2004 Snow
2004/0248639 A1 12/2004 Slomiany
2004/0266509 A1 12/2004 Bennett et al.
2005/0009597 A1 1/2005 Daly
2005/0014553 A1 1/2005 Byrne
2005/0020351 A1 1/2005 Baerlocher et al.
2005/0033461 A1 2/2005 Gerrard et al.
2005/0037836 A1 2/2005 Gilmore et al.
2005/0040601 A1 2/2005 Yoseloff et al.
2005/0043081 A1 2/2005 Baerlocher
2005/0054405 A1 3/2005 Baerlocher et al.
2005/0054415 A1 3/2005 Kaminkow et al.
2005/0054416 A1 3/2005 Hostetler et al.
2005/0054434 A1 3/2005 Baerlocher et al.
2005/0054435 A1 3/2005 Rodgers et al.
2005/0054436 A1 3/2005 Frizzell et al.
2005/0059456 A1 3/2005 Mead et al.
2005/0059461 A1 3/2005 Ching et al.
2005/0071023 A1 3/2005 Gilliland et al.
2005/0096123 A1 5/2005 Cregan et al.
2005/0101372 A1 5/2005 Mierau et al.
2005/0101378 A1 5/2005 Kaminkow et al.
2005/0124406 A1 6/2005 Cannon
2005/0148384 A1 7/2005 Marks et al.
2005/0164793 A1 7/2005 Merimovich et al.
2005/0181853 A1 8/2005 Baerlocher
2005/0187011 A1 8/2005 Kaminkow
2005/0192081 A1 9/2005 Marks et al.
2005/0192091 A1 9/2005 Siewert et al.
2005/0239528 A1 10/2005 Moody
2005/0245307 A1 11/2005 Gatto et al.
2005/0282620 A1 12/2005 Marks et al.
2005/0288094 A1 12/2005 Marks et al.
2006/0003832 A1 1/2006 Mincey et al.
2006/0025196 A1 2/2006 Webb et al.
2006/0030387 A1 2/2006 Jackson
2006/0030401 A1 2/2006 Mead et al.
2006/0046836 A1 3/2006 Walker et al.
2006/0058095 A1 * 3/2006 Berman et al. .................. 463/16
2006/0068882 A1 3/2006 Baerlocher et al.
2006/0068883 A1 3/2006 Randall et al.

(56) References Cited

U.S. PATENT DOCUMENTS

| | | | |
|---|---|---|---|
| 2006/0073874 | A1 | 4/2006 | Cregan et al. |
| 2006/0084497 | A1 | 4/2006 | Marks et al. |
| 2006/0084500 | A1 | 4/2006 | Baerlocher et al. |
| 2006/0121969 | A1 | 6/2006 | Marks et al. |
| 2006/0121978 | A1 | 6/2006 | Hornik et al. |
| 2006/0172795 | A1 | 8/2006 | Bussick et al. |
| 2006/0183528 | A1 | 8/2006 | Rodgers et al. |
| 2006/0183535 | A1 | 8/2006 | Marks et al. |
| 2006/0205473 | A1 | 9/2006 | Gomez et al. |
| 2006/0205474 | A1 | 9/2006 | Bansemer et al. |
| 2006/0246977 | A1 | 11/2006 | Cannon |
| 2006/0276243 | A1 | 12/2006 | Reisdorff et al. |
| 2007/0015566 | A1 | 1/2007 | Baerlocher et al. |
| 2007/0021176 | A1 | 1/2007 | Jackson |
| 2007/0026923 | A1 | 2/2007 | Muir |
| 2007/0032285 | A1 | 2/2007 | Wolf |
| 2007/0060271 | A1 | 3/2007 | Cregan et al. |
| 2007/0087809 | A1 | 4/2007 | Baerlocher |
| 2007/0111783 | A1 | 5/2007 | Cuddy et al. |
| 2007/0117606 | A1 | 5/2007 | Baerlocher |
| 2007/0129128 | A1 | 6/2007 | McClintic |
| 2007/0129131 | A1 | 6/2007 | Kaminkow et al. |
| 2007/0129133 | A1 | 6/2007 | Bansemer et al. |
| 2007/0149267 | A1 | 6/2007 | Ross et al. |
| 2007/0149269 | A1 | 6/2007 | Benbrahim |
| 2008/0004105 | A1 | 1/2008 | Cregan et al. |
| 2008/0119283 | A1 | 5/2008 | Baerlocher |
| 2008/0146321 | A1 | 6/2008 | Parente |
| 2008/0188287 | A1 | 8/2008 | Schlegel et al. |
| 2008/0200238 | A1 | 8/2008 | Mishra |
| 2008/0311980 | A1 | 12/2008 | Cannon |
| 2009/0104959 | A1 | 4/2009 | Caputo et al. |
| 2009/0124326 | A1 | 5/2009 | Caputo et al. |
| 2009/0166971 | A1 | 7/2009 | Mebane |
| 2011/0039614 | A1 | 2/2011 | Caputo et al. |

FOREIGN PATENT DOCUMENTS

| | | |
|---|---|---|
| AU | 711501 | 10/1999 |
| CA | 2288723 | 10/1998 |
| EP | 219305 | 4/1987 |
| EP | 0698869 | 2/1996 |
| EP | 0798676 | 10/1997 |
| EP | 0874337 | 10/1998 |
| EP | 0945837 | 3/1999 |
| EP | 1083531 | 3/2001 |
| EP | 1205897 | 10/2001 |
| EP | 1298601 | 4/2003 |
| EP | 1336941 | 8/2003 |
| EP | 1617386 | 1/2006 |
| EP | 1635306 | 3/2006 |
| EP | 1653416 | 5/2006 |
| GB | 2089086 | 6/1982 |
| GB | 2090690 | 7/1982 |
| GB | 2096376 | 10/1982 |
| GB | 2097160 | 10/1982 |
| GB | 2100905 | 1/1983 |
| GB | 2105891 | 3/1983 |
| GB | 2106682 | 4/1983 |
| GB | 2117155 | 10/1983 |
| GB | 2130413 | 5/1984 |
| GB | 2137392 | 10/1984 |
| GB | 2144644 | 3/1985 |
| GB | 2147442 | 5/1985 |
| GB | 2147773 | 5/1985 |
| GB | 2161008 | 1/1986 |
| GB | 2183882 | 6/1986 |
| GB | 2170643 | 8/1986 |
| GB | 2181589 | 4/1987 |
| GB | 2190227 | 11/1987 |
| GB | 2191030 | 12/1987 |
| GB | 2213624 | 8/1989 |
| GB | 2222712 | 3/1990 |
| GB | 2225889 | 6/1990 |
| GB | 2226436 | 6/1990 |
| GB | 2242300 | 9/1991 |
| GB | 2262642 | 6/1993 |
| GB | 2316214 | 2/1998 |
| GB | 2201821 | 9/1998 |
| GB | 2328311 | 2/1999 |
| GB | 2333880 | 8/1999 |
| GB | 2341262 | 3/2000 |
| GB | 2353128 | 2/2001 |
| GB | 2372132 | 8/2002 |
| GB | 2422121 | 7/2006 |
| WO | WO 8500910 | 2/1985 |
| WO | WO 9635491 | 11/1996 |
| WO | WO 9732285 | 9/1997 |
| WO | WO 9851384 | 11/1998 |
| WO | WO 9964997 | 12/1999 |
| WO | WO 0012186 | 3/2000 |
| WO | WO 0032286 | 6/2000 |
| WO | WO 0115055 | 3/2001 |
| WO | WO 0126019 | 4/2001 |
| WO | WO 0141892 | 6/2001 |
| WO | WO 0174464 | 10/2001 |
| WO | WO 0193967 | 12/2001 |
| WO | WO 02077935 | 10/2002 |
| WO | WO 02102484 | 12/2002 |
| WO | WO 03089084 | 10/2003 |
| WO | WO 03089088 | 10/2003 |
| WO | WO 2005009560 | 3/2005 |
| WO | WO 2005027058 | 3/2005 |
| WO | WO 2005027061 | 3/2005 |
| WO | WO 2005035080 | 4/2005 |
| WO | WO 2005057339 | 6/2005 |
| WO | WO 2005075037 | 8/2005 |
| WO | WO 2005086018 | 9/2005 |
| WO | WO 2005105241 | 11/2005 |
| WO | WO 2006009248 | 1/2006 |
| WO | WO 2007021724 | 7/2007 |

* cited by examiner

GAMING SYSTEM AND METHOD FOR PROVIDING A SYMBOL ELIMINATION GAME

CROSS-REFERENCE TO RELATED APPLICATIONS

This application relates to the following co-pending commonly owned patent applications: "GAMING SYSTEM AND METHOD FOR PROVIDING A SYMBOL ELIMINATION GAME," Ser. No. 13/789,035.

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur provide higher awards. In such known gaming machines, the amount of the wager made on the base game by the player can vary.

Secondary or bonus games are also known in gaming machines. The secondary or bonus games usually provide an additional award to the player. Secondary or bonus games usually do not require an additional wager by the player to be activated. Certain secondary or bonus games are activated or hit upon an occurrence of a designated triggering symbol or triggering symbol combination in the primary or base game. For instance, a bonus symbol occurring on the payline on the third reel of a three reel slot machine may hit the secondary bonus game. Part of the enjoyment and excitement of playing certain gaming machines is the occurrence or triggering of the secondary or bonus game (even before the player knows how much the bonus award will be).

Certain known secondary games include a path wherein a symbol advances from one location of the path toward a destination location of the path. In certain of these known secondary games, a player may receive bonus values when the player's symbol lands on various locations of the path. In certain of these known secondary games, the player may receive a relatively high bonus value when the player's symbol reaches the destination location of the path.

There is a continuing need to provide new and different gaming systems that provide awards to players utilizing one or more paths.

SUMMARY

In various embodiments, the present disclosure relates generally to gaming systems and methods for providing a symbol elimination game. In such embodiments, the symbol elimination game includes: (i) a plurality of symbol display positions which form a path, (ii) one or more eliminator display positions distinct from and associated with the formed path, (iii) a single continuous series or chain of symbols displayed at the symbol display positions of the path, and (iv) one or more eliminators displayed at the eliminator display positions. In operation of such embodiments, the gaming system displays the symbols moving along the formed path wherein as such symbols move, the gaming system causes one or more of the eliminators to eliminate zero, one or more of the symbols. Following the movement of the chain of symbols through the formed path of symbol display positions, the gaming system determines and displays an award, wherein the determined award is based, at least in part, on which symbols were eliminated and which symbols successfully completed the path of symbol display positions (i.e., which symbols were not eliminated). Such a configuration provides an increased level of excitement and enjoyment for certain players as such player's experience the anticipation associated with which symbols will be eliminated and which symbols will avoid elimination More specifically, in operation of certain embodiments, upon an initiation of the symbol elimination game disclosed herein, the gaming system displays a path of symbol display positions and one or more eliminators at one or more eliminator display positions. Each eliminator display position is associated with one or more symbol display positions of the formed path, such as located adjacent to at least one of the symbol display positions of the formed path. In one such embodiment, the gaming system displays a static or predefined path of symbol display positions and/or one or more eliminator display positions located at one or more static or predefined positions adjacent to such symbol display positions of the path. In another such embodiment, for different games played, the gaming system displays a randomly determined path of symbol display positions and/or one or more eliminator display positions located at one or more randomly selected positions adjacent to such symbol display positions of the path. In another such embodiment, for different games played, the gaming system enables one or more players to select one or more eliminator display positions located at one or more positions adjacent to the symbol display positions of the path.

After displaying the path of symbol display positions and at least one eliminator at at least one eliminator display position, the gaming system causes the chain of symbols to move or proceed through the symbol display positions of the path. In one embodiment, this movement occurs by the gaming system displaying the chain of symbols entering the path at a starting symbol display position, moving in one direction through a plurality of adjacent symbol display positions of the path (wherein each symbol display position is adjacent to at least two other symbol display positions) and exiting at an ending symbol display position of the path.

In addition to moving the chain of symbols through the symbol display positions of the path, the gaming system determines whether any of the eliminators cause an elimination of any of the symbols of the moving chain of symbols. That is, in association with the gaming system displaying one or more symbols at one or more symbol display positions, the gaming system determines if any eliminators at any eliminator display positions eliminate zero, one or more of such symbols. In one such embodiment, for one, more or each of the symbols of the chain displayed at a symbol display position adjacent to an eliminator display position, the gaming system determines, based on one or more interactions between the symbol and one or more eliminators, whether or not the eliminator of that eliminator display position eliminates, nullifies or otherwise destroys such a symbol. If the gaming system determines that the eliminator of an eliminator display position does not eliminate a symbol of the chain, the gaming system causes that symbol to proceed to the next, if any, symbol display position of the path. On the other hand, if the gaming system determines that the eliminator of an eliminator display position eliminates, nullifies or otherwise destroys a symbol of the chain, the gaming system removes the eliminated symbol from the chain of symbols for that play of the game. Accordingly, as the symbols of the chain traverse the path of symbol display positions, the gaming system of these embodiments causes the eliminators to eliminate or nullify zero, one or more of such symbols, wherein any award provided to the player is based, at least in part, on which symbols of the chain complete the path of symbol display positions without being eliminated. Put differently, as the gaming system eliminates, based at least in part on the presence of any eliminators, zero, one or more symbols of the chain, the gaming system: (i) displays each of the symbols of the chain of symbols entering the path at the starting symbol display position of the path, (ii) displays zero, one or more of the symbols of the chain (i.e., any non-eliminated symbols) moving in one direction through each of the plurality of adjacent symbol display positions of the path, and (iii) displays zero, one or more of the symbols of the chain (i.e., any non-eliminated symbols) exiting at the ending symbol display position of the path.

In one embodiment, different symbols and/or different eliminators have different attributes, characteristics or parameters such that different eliminators have different affects on different symbols. In these embodiments, the determination of whether an eliminator eliminates a symbol is based on the attributes, characteristics or parameters of the symbol and/or the attributes, characteristics or parameters of the eliminator. For example, a first eliminator is configured to eliminate a first type of symbol, but not affect a second, different type of symbol, while a second, different eliminator is configured to eliminate the first type of symbol, but not affect the second, different type of symbol.

Following either the elimination of each symbol from the chain of symbols or each non-eliminated symbol of the chain of symbols exiting the path at the ending symbol display position, the gaming system determines and displays an award. In one such embodiment, the award is based on the quantity of symbols that reached the exit symbol display position. In another such embodiment, the award is based on the quantity of eliminated symbols. Such configurations increase the level of excitement and enjoyment for players because as the play of the game progresses, zero, one or more symbols are eliminated, wherein such eliminated symbols affect the amount of the award ultimately provided to the player. Such configurations further provide, for certain players, an increased amount of anticipation associated with not knowing which symbols of the single, continuous chain of symbols, if any, will be eliminated from the moving chain of symbols.

Additional features and advantages are described in, and will be apparent from, the following Detailed Description and the figures.

DETAILED DESCRIPTION

Symbol Elimination

In various embodiments, the gaming system disclosed herein provides a symbol elimination game which utilizes a single continuous series or chain of symbols displayed at a plurality of symbol display positions of a formed path and further utilizes one or more eliminators displayed at one or more eliminator display positions associated with and distinct from the symbol display positions of the formed path. Specifically, in various embodiments, the gaming system: (i) displays the chain of symbols continuously moving through the path of symbol display positions, and (ii) eliminates zero, one or more of such symbols based on one or more interactions between such symbols and the symbol display eliminators displayed at the eliminator display positions.

While the embodiments described below are directed to a primary wagering game, it should be appreciated that the present disclosure may additionally or alternatively be employed in association with a secondary or bonus game. Moreover, while the player's credit balance, the player's wager, and any awards are displayed as an amount of monetary credits or currency in certain of the embodiments described below, one or more of such player's credit balance, such player's wager, and any awards provided to such a player may be for non-monetary credits, promotional credits, and/or player tracking points or credits.

Figure 1:
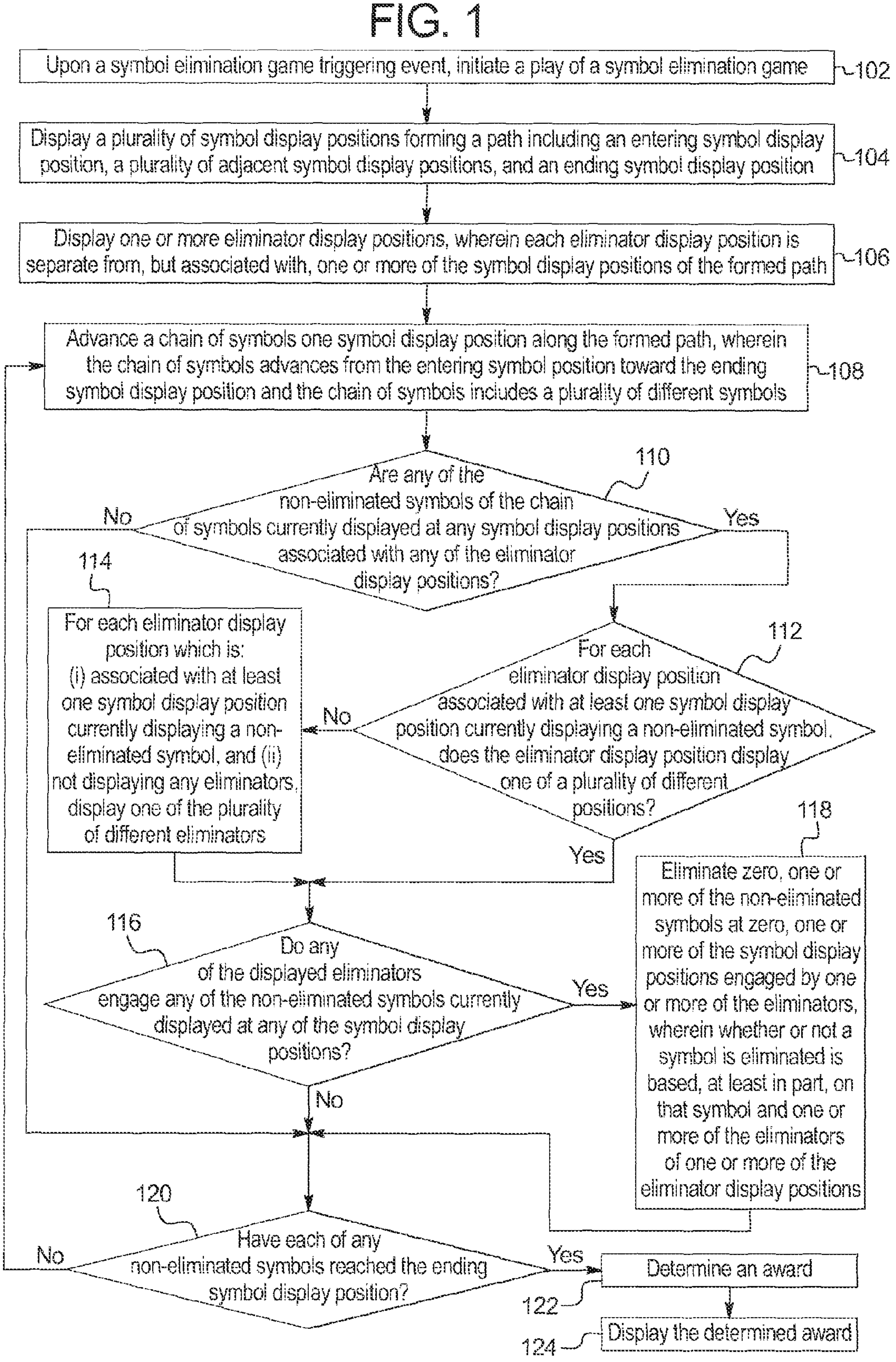
FIG. 1 is a flow chart an example process for operating a gaming system providing one embodiment of the symbol elimination game disclosed herein.

Referring now to FIG. 1, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In one embodiment, upon an occurrence of a symbol elimination game triggering event, as indicated in block 102 of FIG. 1, the gaming system triggers a play of a symbol elimination game. In one embodiment, the symbol elimination game is a primary game wherein a symbol elimination game triggering event occurs upon a player placing a wager to play the symbol elimination game. In another embodiment, the symbol elimination game is a secondary or bonus game wherein a symbol elimination game triggering event occurs based on a displayed event associated with a wagered on play of a primary game. In another embodiment wherein the symbol elimination game is a secondary or bonus game, a symbol elimination game triggering event occurs based on an event independent of any displayed event associated with a wagered on play of a primary game.

In one embodiment, for the triggered symbol elimination game, the gaming system displays a plurality of symbol display positions forming a path as indicated in block 104. The formed path of symbol display positions includes a starting or entering symbol display position, a plurality of adjacent symbol display positions (wherein each symbol display position is adjacent to at least two other symbol display positions) and an ending or exit symbol display position. In different embodiments, the path of symbol display positions extends in one or more directions to form one or more shapes or patterns.

In addition to displaying the formed path of symbol display positions, for the triggered symbol elimination game, as seen in FIG. 1, the gaming system displays one or more eliminator display positions as indicated in block 106. In this embodiment, each eliminator display position is separate from, but associated with one or more of the symbol display positions of the formed path. For example, each eliminator display position is located adjacent to one or more of the symbol display positions of the formed path.

Following the gaming system displaying the formed path of symbol display positions and displaying one or more eliminator display positions, as indicated by block 108 of FIG. 1, the gaming system advances or moves a chain of symbols one symbol display position along the formed path. In this embodiment, the gaming system advances or moves the chain of symbols in a direction of movement from the entering symbol position toward the ending symbol display position.

In one embodiment, a plurality of the symbols of the chain of symbols are different. In another embodiment, each of the symbols of the chain of symbols are different. In these embodiments, two or more different symbols have different attributes, characteristics or parameters. For example, one type of symbol has the attribute of armor, wherein such an armored symbol cannot be damaged by any eliminators except for eliminators having the attribute of electricity (as discussed below). In this example, another type of symbol has the attribute of ice, wherein such an ice symbol can be damaged by any eliminator but is more susceptible to damage from an eliminator having the attribute of fire (as also discussed below).

After moving the chain of symbols one symbol display position toward the ending symbol display position, the gaming system determines if any of the non-eliminated symbols of the chain of symbols are currently displayed at any symbol display positions associated with any of the eliminator display positions as indicated in diamond 110 of FIG. 1. That is, after moving the chain of symbols one symbol display position, the gaming system determines if any symbols currently occupy any symbol display positions which are associated with any eliminator display positions such that any eliminators at such eliminator display positions may subsequently engage that symbol as described below.

If the gaming system determines that at least one of the non-eliminated symbols of the chain of symbols is currently displayed at at least one of the symbol display positions associated with at least one of the eliminator display positions, as indicated in diamond 112, for each eliminator display position associated with at least one symbol display position currently displaying a non-eliminated symbol, the gaming system determines if the eliminator display position displays one of a plurality of different eliminators. Put differently, as the first remaining non-eliminated symbol in the chain of symbols approaches each eliminator display position, the gaming system determines whether that eliminator display position displays any eliminators.

If the gaming system determines that an eliminator display position associated with at least one symbol display position currently displaying at least one symbol does not display any eliminators, as indicated in block 114, the gaming system displays one of a plurality of eliminators at such an eliminator display position.

In one embodiment, each of the eliminators displayed at each of the eliminator display positions are the same. In another embodiment, a plurality of the eliminators displayed at a plurality of the eliminator display positions are different. In another embodiment, each of the eliminators displayed at each of the eliminator display positions are different. In these embodiments, different eliminators have different attributes, characteristics or parameters such that different eliminators have different affects on different symbols. For example, one type of eliminator has the attribute of electricity, wherein such an electric eliminator can damage (and/or eliminate) each of the symbols including the above-described armored symbols. In this example, another type of eliminator has the attribute of fire, wherein such a fire eliminator can damage (and/or eliminate) each of the symbols, but does an increased amount of damage to the above-described ice symbols. It should be appreciated that since different eliminators and different symbol have different attributes, one eliminator having a first attribute has a different effect on a symbol than another eliminator having a second attribute. That is, the same symbol, based at least partially on the attribute of that symbol and at least partially on the attribute of the eliminator which engages that symbol, may incur a first amount of damage (or may be configured to absorb a first amount of damage before that symbol is eliminated) from a first eliminator having a first attribute and may incur a second, different amount of damage (or may be configured to absorb a second, different amount of damage before that symbol is eliminated) from a second eliminator having a second, different attribute.

In another example, different eliminators have different attributes, characteristics or parameters pertaining to how such eliminators engage one or more symbols. In one example, such an attribute pertains to an amount of damage an eliminator may cause to one or more symbols of the chain of symbols. In another example, such an attribute pertains to how frequently an eliminator may damage and/or eliminate a symbol of the chain of symbols. In another example, such an attribute pertains to how many symbols of the chain of symbols an eliminator may simultaneously damage and/or eliminate. In another example, such an attribute pertains to a engagement distance or range of an eliminator (i.e., how many symbol display positions away from an eliminator display position of an eliminator may a symbol be and still be engaged by an eliminator).

After displaying any eliminator at the eliminator display position associated with a symbol display position currently occupied by a symbol or after determining that each of the eliminator display positions associated with each of the symbol display positions currently displaying a non-eliminated symbol already display one of the plurality of different eliminators, the gaming system determines if any of the displayed eliminators engage any of the non-eliminated symbols currently displayed at any of the symbol display positions as indicated in diamond 116. In other words, if a non-eliminated symbol has moved to a symbol display position associated with an eliminator display position having an eliminator, the gaming system determines whether or not the eliminator engages or otherwise attacks the symbol.

If the gaming system determines that at least one eliminator at at least one eliminator display position engages at least one non-eliminated symbol currently displayed at at least one symbol display position, the gaming system eliminates zero, one or more of the non-eliminated symbols at zero, one or more of the symbol display positions engaged by one or more of the eliminators as indicated in block 118. In one embodiment, whether or not a symbol is eliminated is based, at least in part, on that symbol and one or more of the eliminators of one or more of the eliminator display positions. That is, one or more attributes of the engaged symbol and one or more attributes of the eliminator determine, at least in part, whether a symbol is eliminated, damaged or not affected by the engagement. For example, a symbol having the attribute of ice may be eliminated when engaged by an eliminator having the attribute of fire, but may only be damaged when engaged by any other eliminator.

Following zero, one or more engaged symbols being eliminated (or following the gaming system determining that no non-eliminated symbols of the chain of symbols are currently displayed at any symbol display positions associated with any of the eliminator display positions or following the determination that none of the displayed eliminators engage any of the non-eliminated symbols currently displayed at any of the symbol display positions), as indicated in diamond 120, the gaming system determines if each of the any non-eliminated symbols have reached the ending symbol display position.

If at least one non-eliminated symbol of the chain of symbols has not reached the ending symbol display position, the gaming system returns to block 108 and again advances the chain of symbols one symbol display position along the formed path. That is, if at least one symbol of the chain remains at one of the adjacent symbol display positions of the path, the gaming system proceeds with moving the chain of symbols through the path of symbol display positions. On the other hand, if each of the non-eliminated symbols of the chain of symbols have reached the ending symbol display position, the gaming system determines and displays an award as indicated in blocks 122 and 124. Put differently, if either each of the symbols of the chain of symbols have been eliminated or each of any non-eliminated symbols have successful traversed the formed path of symbol display positions and reached the ending symbol display position, the gaming system determines and displays an award for the play of the symbol elimination game.

In one embodiment, the gaming system determines an award for the play of the symbol elimination game based on the quantity of symbols eliminated from the chain of symbols. In this embodiment, the greater the quantity of symbols eliminated by the eliminators at the eliminator display positions, the greater the determined award. In one such embodiment, the gaming system determines an award based on the quantity and types of eliminated symbols. For example, each eliminated symbol having the attribute of ice is associated with an award of fifty credits and each eliminated symbol having the attribute of armor is associated with an award of one-hundred credits. In another such embodiment, the gaming system determines an award based on a combination of the eliminated symbols. For example, one eliminated symbol having the attribute of armor is associated with an award of one-hundred credits, a combination of two eliminated symbols each having the attribute of armor is associated with an award of two-hundred-fifty credits and a combination of three eliminated symbols each having the attribute of armor is associated with an award of one-thousand credits.

In another embodiment, the gaming system determines an award for the play of the symbol elimination game based on the quantity of non-eliminated symbols from the chain of symbols that reach the ending symbol display position. In this embodiment, the lower the quantity of symbols eliminated by the eliminators at the eliminator display positions, the greater the determined award. In one such embodiment, the gaming system determines an award based on the quantity and types of non-eliminated symbols that reached the ending symbol display position. For example, each non-eliminated symbol that reached the ending symbol display position having the attribute of armor is associated with an award of fifty credits and each non-eliminated symbol that reached the ending symbol display position having the attribute of ice is associated with an award of one-hundred credits. In another such embodiment, the gaming system determines an award based on a combination of non-eliminated symbols that reached the ending symbol display position. For example, one non-eliminated symbol having the attribute of armor that reached the ending symbol display position is associated with an award of one-hundred credits, a combination of two non-eliminated symbols (each having the attribute of armor) that reached the ending symbol display position is associated with an award of two-hundred-fifty credits and a combination of three non-eliminated symbols (each having the attribute of armor) that reached the ending symbol display position is associated with an award of one-thousand credits.

Figure 2A:
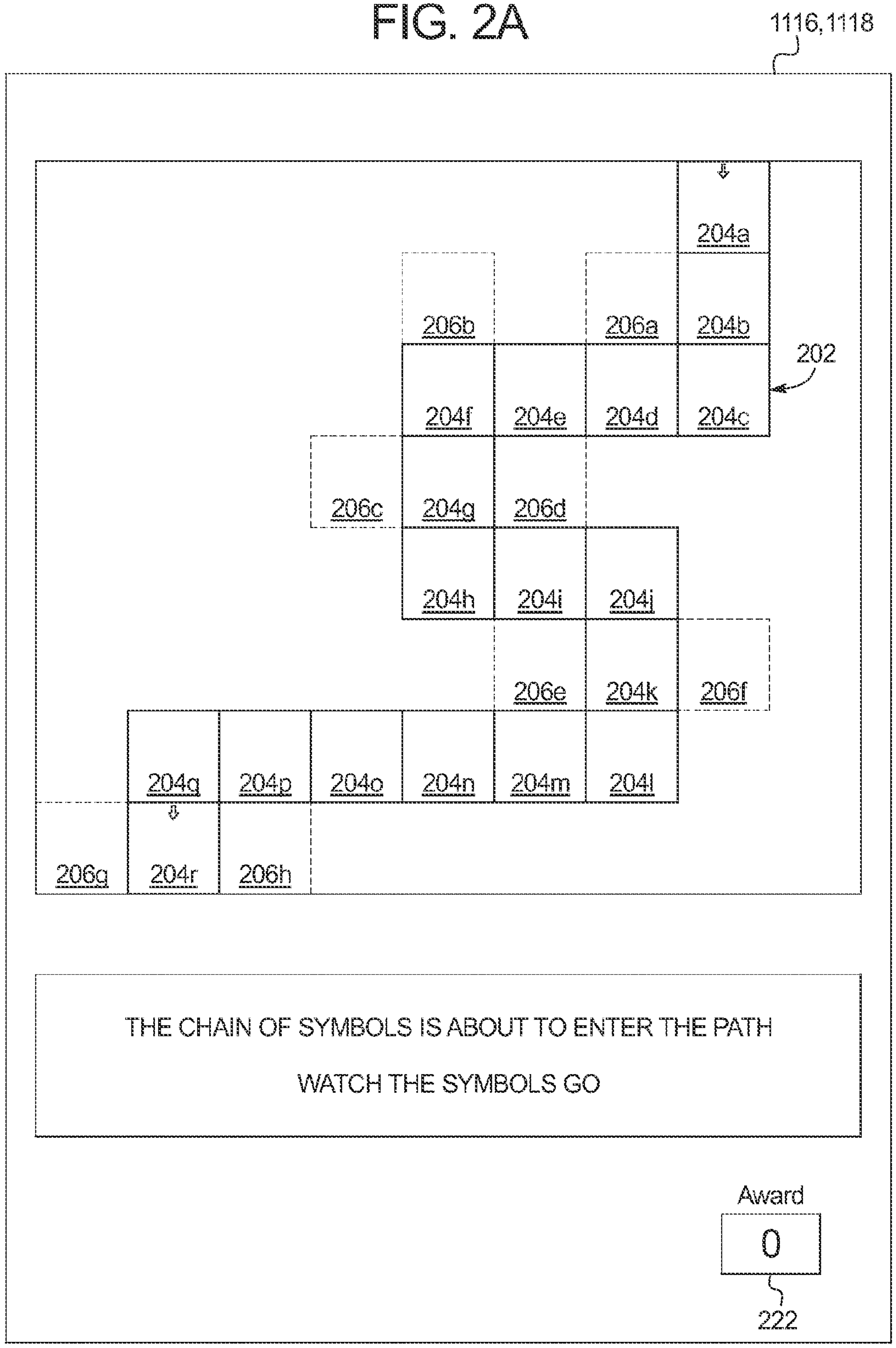
FIGS. 2A, 2B, 2C, 2D, 2E, 2F, 2G, 2H and 2I are front views of one embodiment of the gaming system disclosed herein illustrating a play of a symbol elimination game.

In one example, as seen in FIG. 2A, following the initiation of the symbol elimination game, the gaming system displays a path of symbol display position 202 formed by symbol display positions 204*a* to 204*r*. In this example, the formed path includes a starting symbol display position 204*a*, a plurality of adjacent symbol display positions 204*b* to 204*q*, and an ending symbol display position 204*r*. As also seen in FIG. 2A, the gaming system displays eliminator display positions 206*a* to 206*h*, wherein each eliminator display position is separate from, but associated with, one or more of the symbol display positions 204 of the formed path. For example, eliminator display position 206*a* is separate from, but associated with symbol display positions 204*b*, 204*c* and 204*d*, while eliminator display position 206*b* is separate from, but associated with symbol display position 204*f*. In this example, the gaming system provides appropriate messages such as "THE CHAIN OF SYMBOLS IS ABOUT TO ENTER THE PATH" and "WATCH THE SYMBOLS GO" to the player visually, or through suitable audio or audiovisual displays.

Figure 2B:
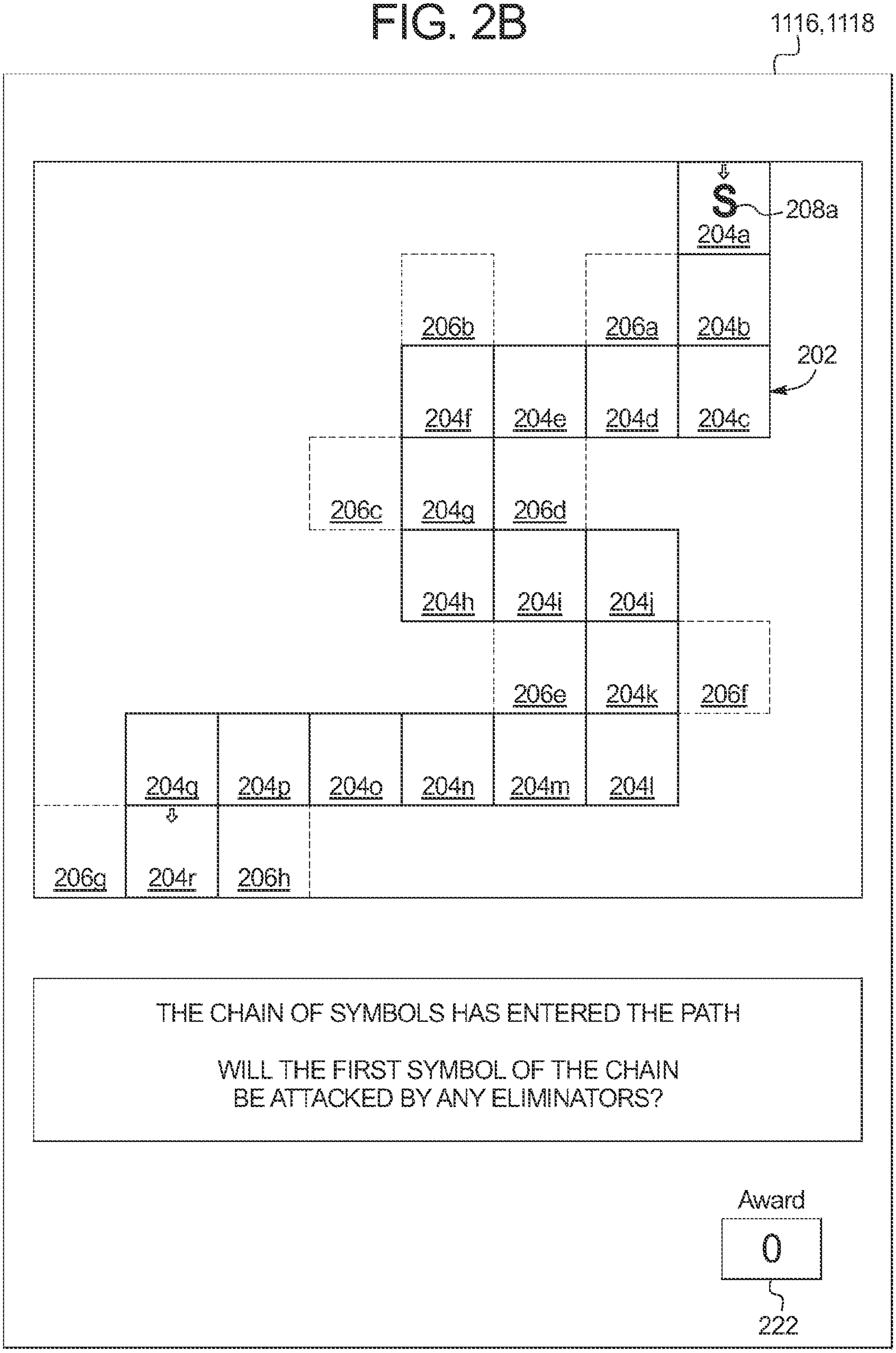

After displaying the formed path of symbol display positions and displaying one or more eliminator display positions, as seen in FIG. 2B, the gaming system displays a first symbol, such as standard symbol 208*a*, entering at the starting symbol display position 204*a* of the formed path. The gaming system then determines if the standard symbol 208*a* (which, at this point in time, represents each of the non-eliminated symbols of the chain of symbols currently displayed at the symbol display positions) is currently displayed at a symbol display position associated with any eliminator display positions. In this example, the gaming system provides appropriate messages such as "THE CHAIN OF SYMBOLS HAS ENTERED THE PATH" and "WILL THE FIRST SYMBOL OF THE CHAIN BE ATTACKED BY ANY ELIMINATORS?" to the player visually, or through suitable audio or audiovisual displays.

Figure 2C:
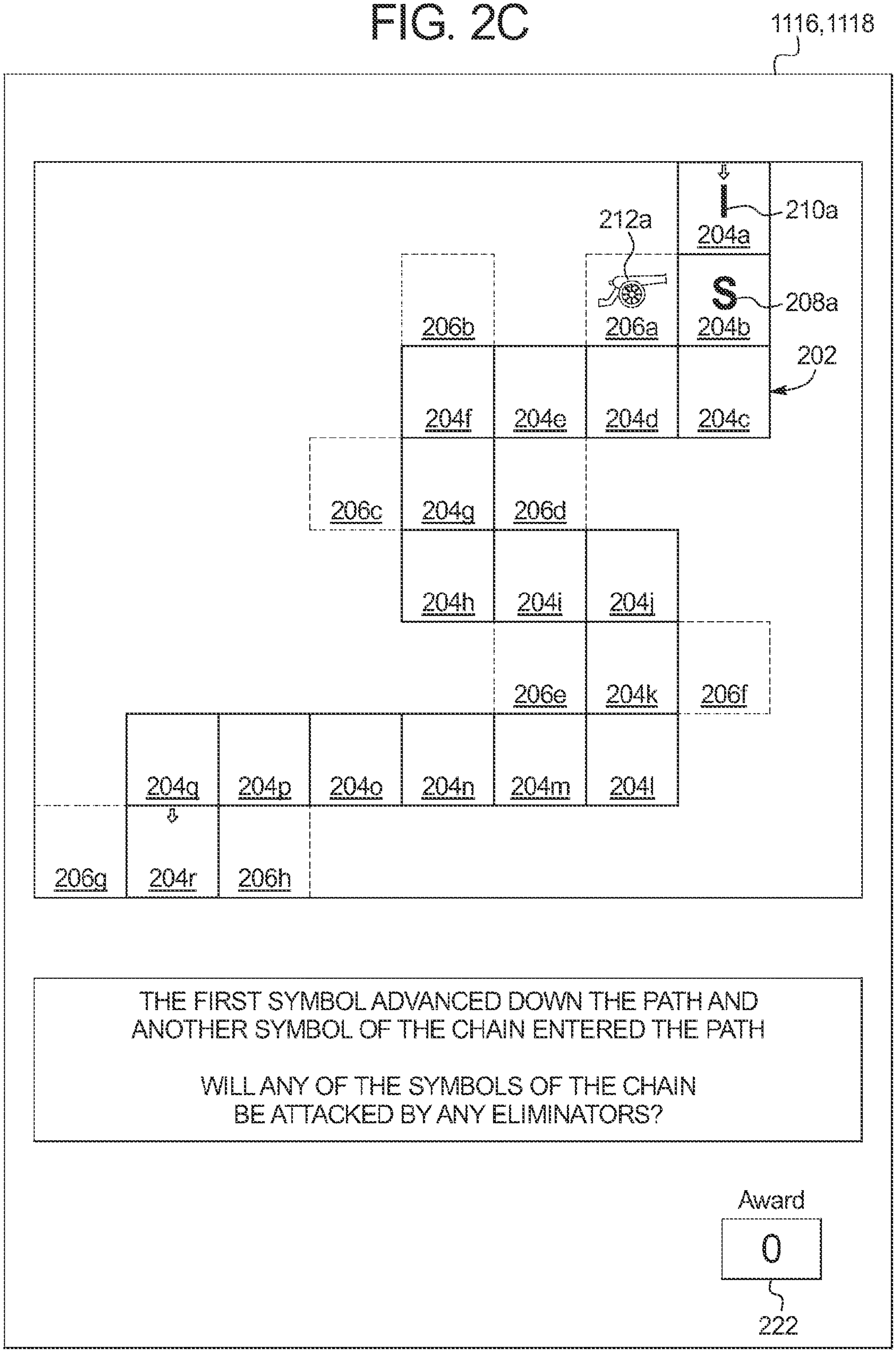

Turning to FIG. 2C, in this example, since: (i) the starting symbol display position 204*a* is not associated with any eliminator display positions, (ii) at least the standard symbol 208*a* of the chain of symbols remains non-eliminated, and (iii) at least the standard symbol 208*a* of the chain of symbols has not reached the ending symbol display position 204*r*, the gaming system advances the chain of symbols one symbol display position. As also seen in FIG. 2C, the gaming system displays the standard symbol 208*a* at symbol display position 204*b* of the formed path and further displays a second symbol, such as ice symbol 210*a*, at starting symbol display position 204*a*. In this example, after determining that symbol display position 204*b* is both currently occupied with a symbol of the chain of symbols and associated with eliminator display position 206*a*, the gaming system displays eliminator, such as standard eliminator 212*a*, at eliminator display position. In this example, the gaming system provides appropriate messages such as "THE FIRST SYMBOL ADVANCED DOWN THE PATH AND ANOTHER SYMBOL OF THE CHAIN ENTERED THE PATH" and "WILL ANY OF THE SYMBOLS OF THE CHAIN BE ATTACKED BY ANY ELIMINATORS?" to the player visually, or through suitable audio or audiovisual displays.

In this example, as the first symbol of the chain of symbols is currently located at a symbol display position associated with an eliminator display position, the gaming system determines whether or not the standard eliminator 212*a* engages the first symbol. In this case, based on one or more factors such as, but not limited to, the distance or range the eliminator is to the symbol, the frequency by which the eliminator may engage symbols and the duration since the eliminator last engaged a symbol, the gaming system determines that standard eliminator 212*a* will engage the standard symbol 208*a*. That is, since the first symbol is within a predefined distance or range of standard eliminator 212*a* at eliminator display position 206*a* and further since standard eliminator 212*a* has not previously engaged any symbols of the chain of symbols, the gaming system determines that standard eliminator 212*a* will engage the standard symbol 208*a*.

Figure 2D:
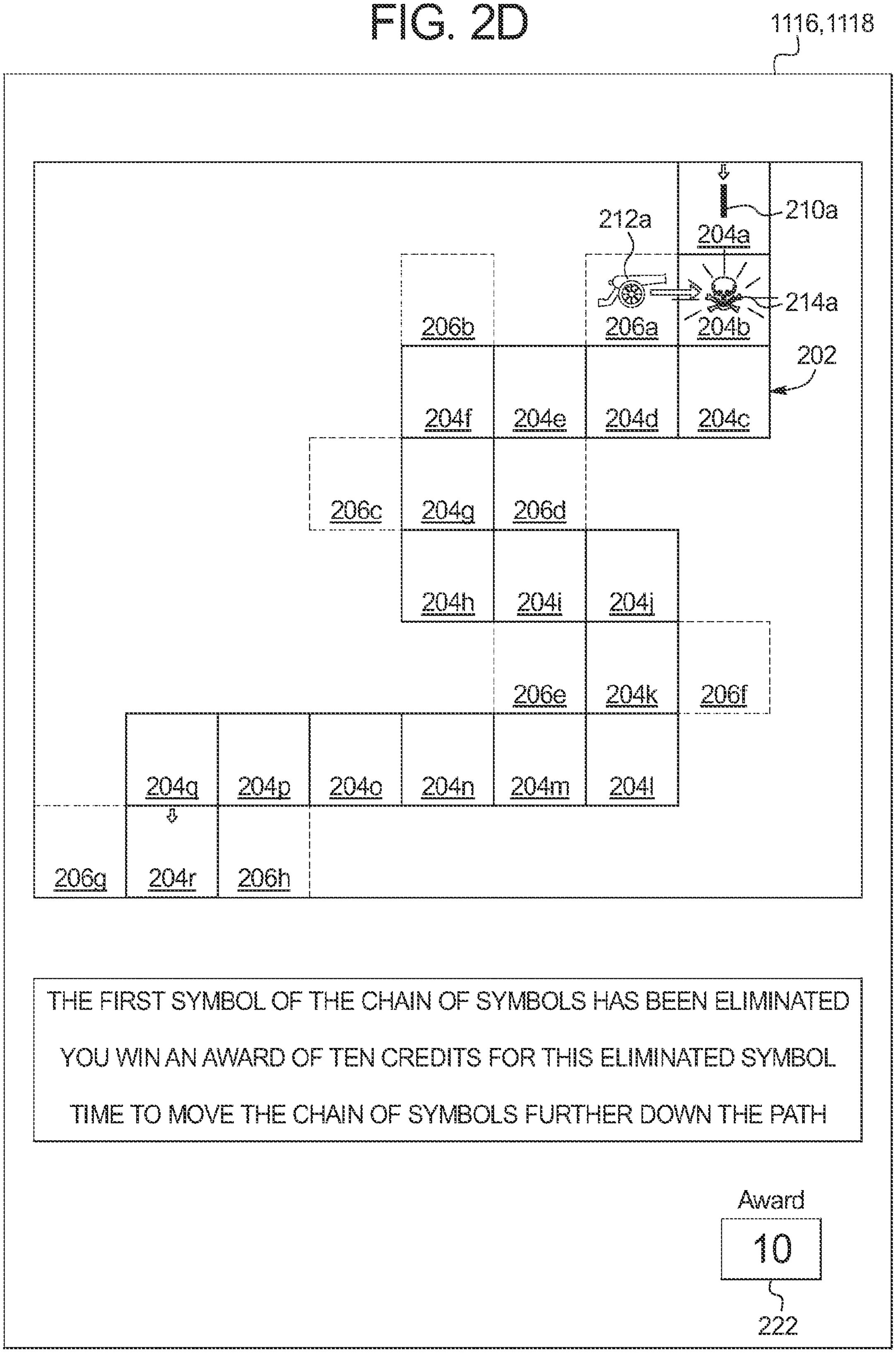

Following a determination that standard eliminator 212*a* at eliminator display position 206*a* engages the first symbol, the gaming system determines whether or not standard eliminator 212*a* eliminates the standard symbol 208*a*. That is, based on one or more factors such as, but not limited to, the attributes of the eliminator, the attributes of the symbol, any amount of previous damage incurred by the symbol, and the distance or range the eliminator is to the symbol, the gaming system determines whether or not to eliminate the engaged symbol. In this case, as seen in FIG. 2D, the standard eliminator 212*a* engaged and eliminated the first symbol (as indicated by eliminated symbol 214*a*). As indicated by award indicator 222, the elimination of the standard symbol 208*a* is associated with an award of ten credits. In this example, the gaming system provides appropriate messages such as "THE FIRST SYMBOL OF THE CHAIN OF SYMBOLS HAS BEEN ELIMINATED", "YOU WIN AN AWARD OF TEN CREDITS FOR THIS ELIMINATED SYMBOL" and "TIME TO MOVE THE CHAIN OF SYMBOLS FURTHER DOWN THE PATH" to the player visually, or through suitable audio or audiovisual displays.

In one embodiment, the gaming system utilizes a point-based system to determine if any engaged symbols are eliminated. In one such embodiment, prior to entering the path of symbol display positions, the gaming system associates a number of points to each symbol of the chain of symbols. In this embodiment, when an eliminator engages a symbol, the gaming system causes the symbol to lose or forfeit zero, one or more associated points. If the eliminator causes the total quantity of points remaining for the symbol to reach a designated threshold quantity, such as zero points remaining, the gaming system marks that symbol as eliminated. In one such embodiment, the quantity of lost points is based on the attributes of the engaged symbol and the attributes of the eliminator. For example, if each symbol starts with one-hundred points, then a symbol having the attribute of ice may lose sixty points when engaged by an eliminator having the attribute of fire and thirty points when engaged by any other eliminator. It should thus be appreciated that in these embodiments, the number of points of a symbol define a likelihood or probability of that symbol surviving an engagement from an eliminator. For example, a first symbol with a low number of points has a lower relative likelihood of surviving an engagement or attack of an eliminator than a second symbol with a high number of points.

Figure 2E:
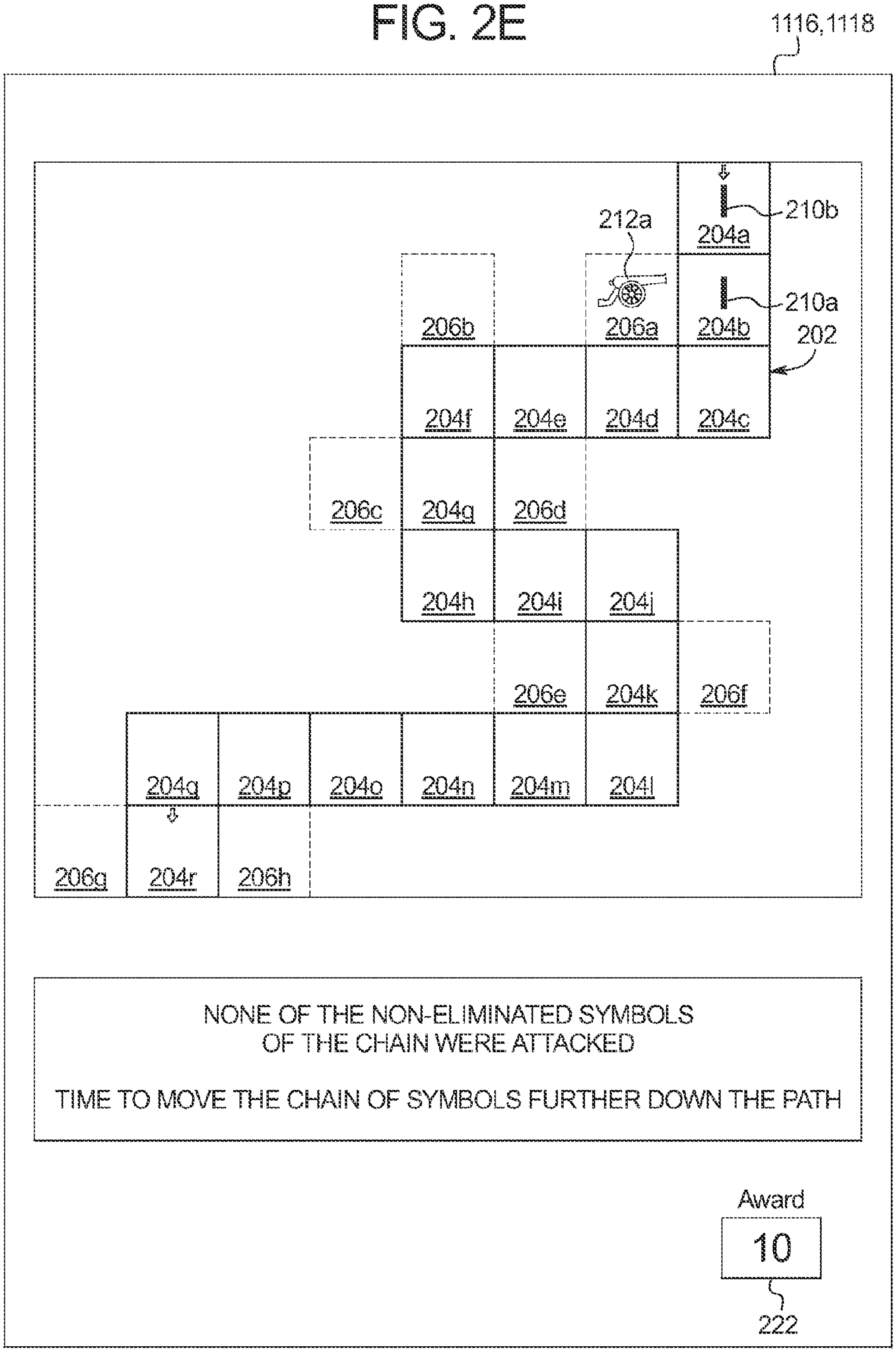

Turning to FIG. 2E, following such an elimination, since at least ice symbol 210*a* of the chain of symbols remains non-eliminated, and at least ice symbol 210*a* of the chain of symbols has not reached the ending symbol display position 204*r*, the gaming system removes eliminated symbol 214*a* from the chain of symbols and advances the chain of symbols one symbol display position. As seen in FIG. 2E, the gaming system advances the chain of symbols such that ice symbol 210*a* is moved to symbol display position 204*b* and ice symbol 210*b* is moved to starting symbol display position 204*a*.

In this example, as ice symbol 210*a* of the chain of symbols is currently located at a symbol display position associated with an eliminator display position, the gaming system determines whether or not the standard eliminator 212*a* engages the second symbol. It should be appreciated that in this embodiment, eliminator symbol display position 206*a* is associated with each of symbol display positions 204*b*, 204*c* and 204*d* and as such, standard eliminator 212*a* may engage any symbols currently located at symbol display positions 204*b*, 204*c* and 204*d*. In this case, based on one or more factors such as, but not limited to, the distance or range the eliminator is to the symbol, the frequency by which the eliminator may engage symbols and the duration since the eliminator last engaged a symbol, the gaming system determines that standard eliminator 212*a* will not engage ice symbol 210*a*. That is, despite the second symbol being within a predefined distance or range of standard eliminator 212*a* at eliminator display position 206*a*, since standard eliminator 212*a* recently engaged (and eliminated) another symbol of the chain of symbols, the gaming system determines that standard eliminator 212*a* is currently not prepared or operable to engage ice symbol 210*a*. Accordingly, since at least ice symbol 210*a* and ice symbol 210*b* of the chain of symbols remains non-eliminated, and at least ice symbol 210*a* and ice symbol 210*b* of the chain of symbols have not reached the ending symbol display position 204*r*, the gaming system advances the chain of symbols one symbol display position. In this example, the gaming system provides appropriate messages such as "NONE OF THE NON-ELIMINATED SYMBOLS OF THE CHAIN WERE ATTACKED" and "TIME TO MOVE THE CHAIN OF SYMBOLS FURTHER DOWN THE PATH" to the player visually, or through suitable audio or audiovisual displays.

Figure 2F:
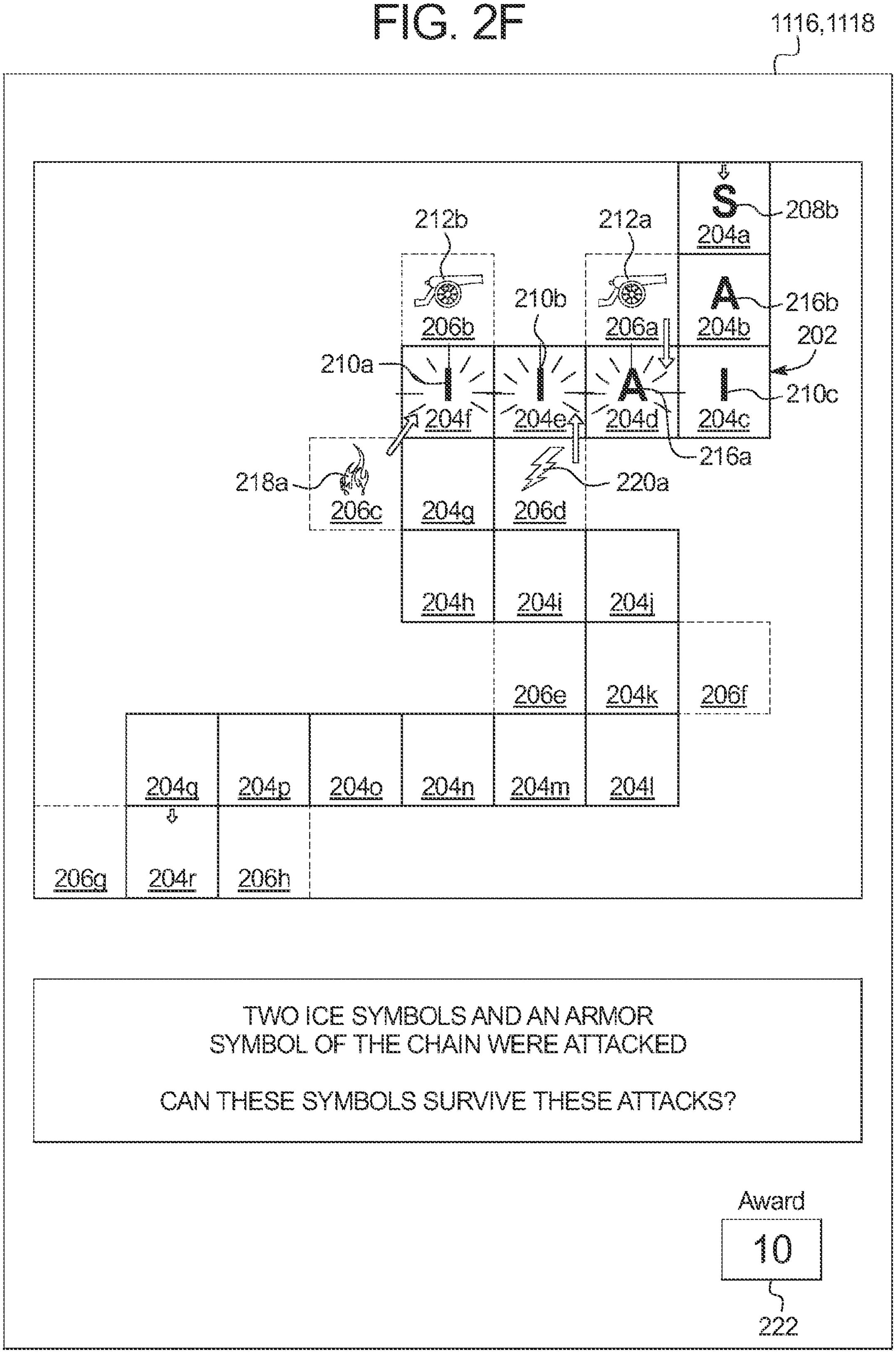

As seen in FIG. 2F, after the chain of symbols has moved or advanced a plurality of symbol display positions toward the ending symbol display position and after the gaming system has displayed a plurality of eliminators at a plurality of eliminator display positions, the gaming system individually determines, for each of a plurality of eliminators displayed at each of a plurality of eliminator display positions, whether that eliminator engages any of the symbols of the chain of symbols currently displayed at a symbol display position associated with that eliminator's eliminator display position. Specifically, the gaming system determines: (i) whether standard eliminator 212*a* at eliminator display position 206*a* engages armor symbol 216*a* at symbol display position 204*d*, (ii) whether standard eliminator 212*a* at eliminator display position 206*a* engages ice symbol 210*c* at symbol display position 204*c*, (iii) whether standard eliminator 212*a* at eliminator display position 206*a* engages armor symbol 216*b* at symbol display position 204*b*, (iv) whether standard eliminator 212*b* at eliminator display position 206*b* engages ice symbol 210*a* at symbol display position 204*f*, (v) whether fire eliminator 218*a* at eliminator display position 206*c* engages ice symbol 210*a* at symbol display position 204*f*, and (vi) whether electric eliminator 220*a* at eliminator display position 206*d* engages ice symbol 210*b* at symbol display position 204*e*.

In this example, based on one or more factors such as, but not limited to, the distance or range the eliminator is to the symbol, the frequency by which the eliminator may engage symbols and the duration since the eliminator last engaged a symbol, the gaming system determines that: (i) standard eliminator 212*a* at eliminator display position 206*a* engages armor symbol 216*a* at symbol display position 204*d*, (ii) standard eliminator 212*a* at eliminator display position 206*a* does not engage ice symbol 210*c* at symbol display position 204*c*, (iii) standard eliminator 212*a* at eliminator display position 206*a* does not engage armor symbol 216*b* at symbol display position 204*b*, (iv) standard eliminator 212*b* at eliminator display position 206*b* does not engage ice symbol 210*a* at symbol display position 204*f*, (v) fire eliminator 218*a* at eliminator display position 206*c* engages ice symbol 210*a* at symbol display position 204*f*, and (vi) electric eliminator 220*a* at eliminator display position 206*d* engages ice symbol 210*b* at symbol display position 204*e*. In this example, the gaming system provides appropriate messages such as "TWO ICE SYMBOLS AND AN ARMOR SYMBOL OF THE CHAIN WERE ATTACKED" and "CAN THESE SYMBOLS SURVIVE THESE ATTACKS?" to the player visually, or through suitable audio or audiovisual displays.

It should be appreciated that as seen in this example, different eliminators are associated with different ranges of symbol display positions. That is, while standard eliminator 212*b* at eliminator display position 206*b* is configured to potentially engage the symbols at the symbol display positions directly next to or adjacent to eliminator display position 206*b* (and is not configured to engage any symbols at any symbol display positions diagonal to eliminator display position 206*b*), fire eliminator 218*a* at eliminator display position 206*c* is configured to potentially engage both the symbols at the symbol display positions directly next to or adjacent to eliminator display position 206*c* and the symbols at the symbol display positions diagonal to eliminator display position 206*c*. In another embodiment (not shown), one or more eliminators are configured to engage any of the symbols at any of the symbol display positions regardless of the distance that eliminator is to any of the symbols at any of the symbol display positions (i.e., one or more eliminators have a range of the entire path of symbol display positions).

Following the determination that three of the eliminators at three of the eliminator display positions will engage three of the symbols at three of the symbol display positions, the gaming system determines, for each eliminator which engages a symbol, whether that eliminator eliminates that symbol from the chain of symbols. As described above, such determinations are based on one or more factors such as, but not limited to, the attributes of the eliminator, the attributes of the symbol, any amount of previous damage incurred by the symbol, and the distance or range the eliminator is to the symbol.

Figure 2G:
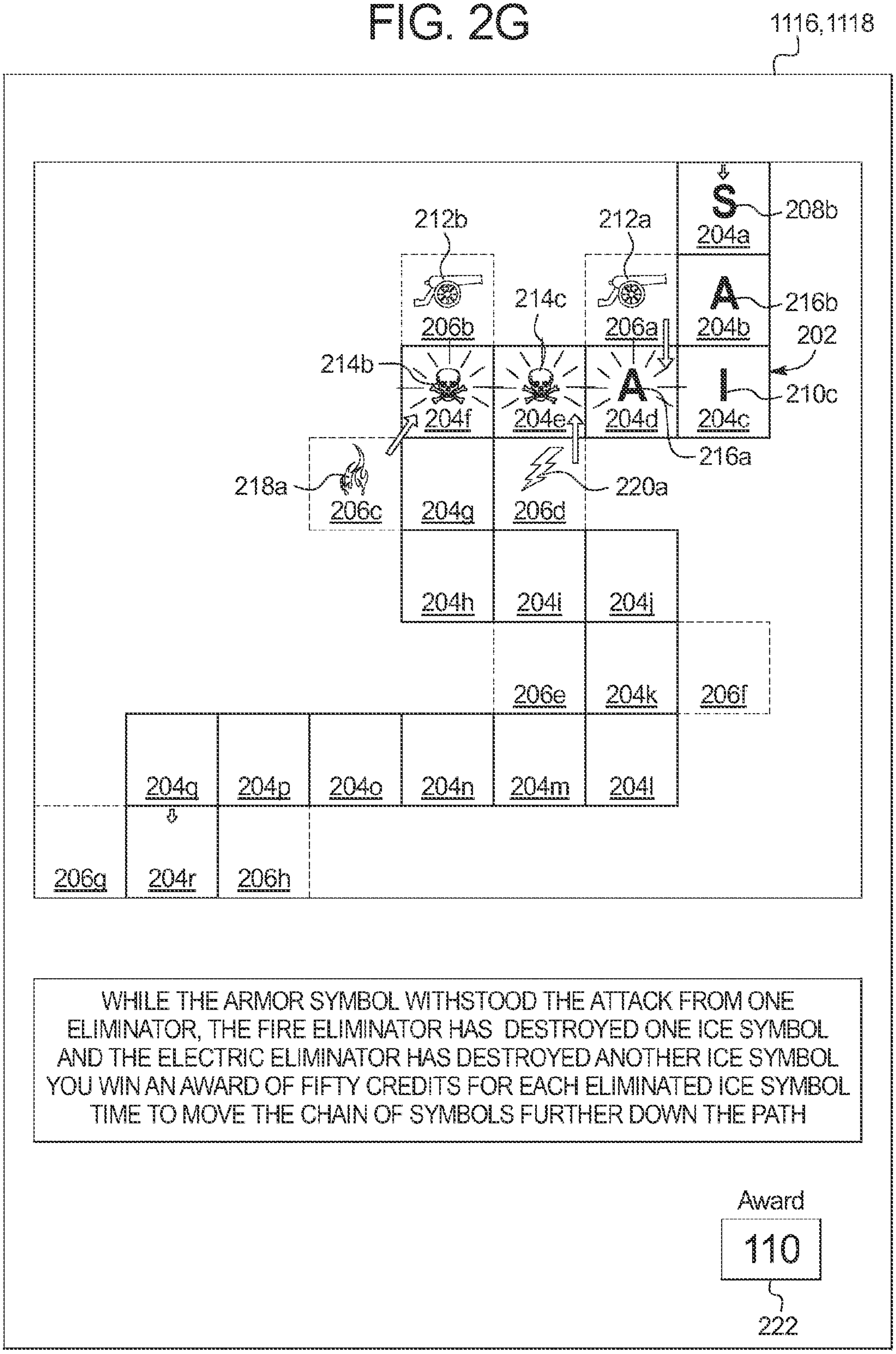

For example, as seen in FIGS. 2F to 2G, for the determination of whether or not standard eliminator 212*a* at eliminator display position 206*a* eliminates armor symbol 216*a* at symbol display position 204*d*, because armor symbol 216*a* has the attribute of armor and standard eliminator 212*a* does not have the attribute of electricity (which is the type of eliminator that can eliminate or destroy an armor symbol), the gaming system determines that standard eliminator 212*a* at eliminator display position 206*a* does not eliminate armor symbol 216*a* at symbol display position 204*d*. In this example, despite being attacked by standard eliminator 212*a*, the specific attributes of armor symbol 216*a* resulted in armor symbol 216*a* surviving the attack and continuing along the path of symbol display positions.

In another example as seen in FIGS. 2F to 2G, for the determination of whether or not fire eliminator 218*a* at eliminator display position 206*c* eliminates ice symbol 210*a* at symbol display position 204*f*, because ice symbol 210*a* has the attribute of ice and fire eliminator 218*a* has the attribute of fire (which is configured to cause additional damage to an ice symbol), the gaming system determines that fire eliminator 218*a* at eliminator display position 206*c* eliminates ice symbol 210*a* at symbol display position 204*f* (indicated as eliminated symbol 214*b* in FIG. 2G). In this example, the specific attributes of fire eliminator 218*a* coupled with the specific attributes of ice symbol 210*a* resulted in ice symbol 210*a* being eliminated from the chain of symbols.

In another example as seen in FIGS. 2F to 2G, for the determination of whether or not electric eliminator 220*a* at eliminator display position 206*d* eliminates ice symbol 210*b* at symbol display position 204*e*, because ice symbol 210*a* has the attribute of ice and electric eliminator 220*a* has the attribute of electric (which is configured to cause damage to an ice symbol), the gaming system determines that electric eliminator 220*a* at eliminator display position 206*d* eliminates ice symbol 210*b* at symbol display position 204*e* (indicated as eliminated symbol 214*c* in FIG. 2G). In this example, the specific attributes of electric eliminator 218*a* coupled with the specific attributes of ice symbol 210*b* resulted in ice symbol 210*b* being eliminated from the chain of symbols.

As indicated by award indicator 222, the elimination of ice symbol 210*a* is associated with an award of fifty credits and the elimination of ice symbol 210*b* is associated with an award of fifty credits to bring the player's current award for the symbol eliminator game to one-hundred-ten credits. In this example, the gaming system provides appropriate messages such as "WHILE THE ARMOR SYMBOL WITHSTOOD THE ATTACK FROM ONE ELIMINATOR, THE FIRE ELIMINATOR HAS DESTROYED ONE ICE SYMBOL AND THE ELECTRIC ELIMINATOR HAS DESTROYED ANOTHER ICE SYMBOL", "YOU WIN AN AWARD OF FIFTY CREDITS FOR EACH ELIMINATED ICE SYMBOL" and "TIME TO MOVE THE CHAIN OF SYMBOLS FURTHER DOWN THE PATH" to the player visually, or through suitable audio or audiovisual displays.

Figure 2H:
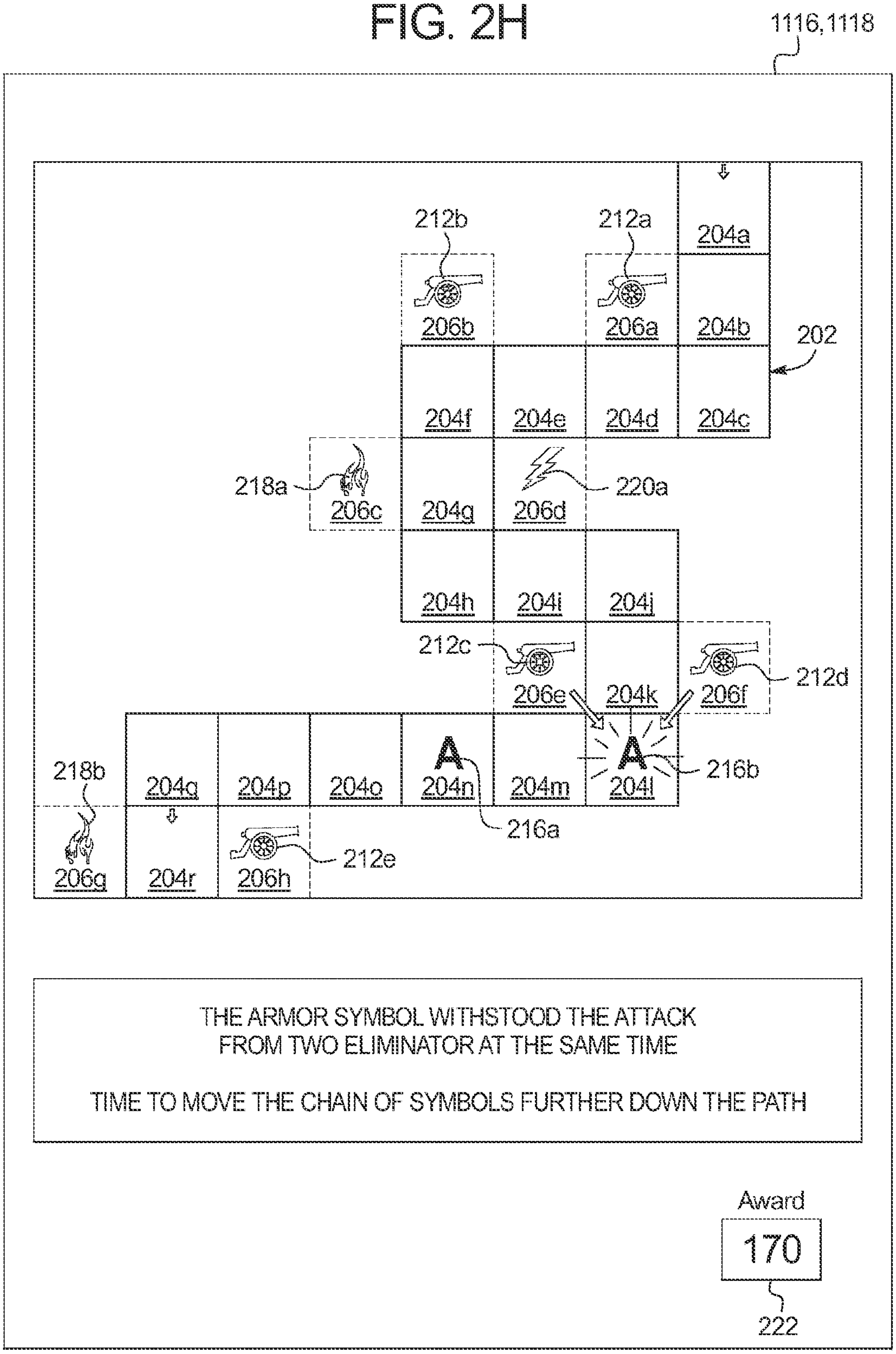

As seen in FIG. 2H, after any eliminated symbols have been removed, after the chain of symbols has moved or advanced a plurality of symbol display positions toward the ending symbol display position, after the gaming system has displayed: (i) standard eliminator 212*c* at eliminator display position 206*e*, (ii) standard eliminator 212*d* at eliminator display position 206*f*, (iii) fire eliminator 218*b* at eliminator display position 206*g*, and (iv) standard eliminator 212*e* at eliminator display position 206*h* and after ice symbol 210*c* and standard symbol 208*b* have been eliminated (to cause an increase of the award amount to one-hundred-seventy credits) such that all but armor symbol 216*a* (currently located in symbol display position 204*n* and armor symbol 216*b* (currently located in symbol display position 204*l*), the gaming system individually determines, for each of a plurality of eliminators displayed at each of a plurality of eliminator display positions, whether that eliminator engages any of the symbols of the chain of symbols currently displayed at a symbol display position associated with that eliminator's eliminator display position. Specifically, in this case, the gaming system determines: (i) whether standard eliminator 212*c* at eliminator display position 206*e* engages armor symbol 216*a* at symbol display position 204*n* or armor symbol

216*b* at symbol display position 204*l*, respectively, and (ii) whether standard eliminator 212*d* at eliminator display position 206*f* engages armor symbol 216*b* at symbol display position 204*l*.

In this example, based on one or more factors such as, but not limited to, the distance or range the eliminator is to the symbol, the frequency by which the eliminator may engage symbols and the duration since the eliminator last engaged a symbol, the gaming system determines that: (i) standard eliminator 212*c* at eliminator display position 206*e* engages armor symbol 216*b* at symbol display position 204*l*, (ii) standard eliminator 212*c* at eliminator display position 206*e* does not engage armor symbol 216*a* at symbol display position 204*n*, and (iii) standard eliminator 212*d* at eliminator display position 206*f* engages armor symbol 216*b* at symbol display position 204*l*. As seen in this example, armor symbol 216*b* is simultaneously engaged by two different eliminators.

Following the determination that two of the eliminators at two of the eliminator display positions will engage one of the symbols at one of the symbol display positions, the gaming system determines, for each eliminator which engages a symbol, whether that eliminator eliminates that symbol from the chain of symbols. As described above, such determinations are based on one or more factors such as, but not limited to, the attributes of the eliminator, the attributes of the symbol, any amount of previous damage incurred by the symbol, and the distance or range the eliminator is to the symbol.

As seen in FIG. 2H, for the determination of whether or not standard eliminator 212*c* at eliminator display position 206*e* eliminates armor symbol 216*b* at symbol display position 204*l*, because armor symbol 216*b* has the attribute of armor and standard eliminator 212*c* does not have the attribute of electricity (which is the type of eliminator that can eliminate or destroy an armor symbol), the gaming system determines that standard eliminator 212*c* at eliminator display position 206*e* does not eliminate armor symbol 216*b* at symbol display position 204*l*. Moreover, for the determination of whether or not standard eliminator 212*d* at eliminator display position 206*f* eliminates armor symbol 216*b* at symbol display position 204*l*, because armor symbol 216*b* has the attribute of armor and standard eliminator 212*d* does not have the attribute of electricity (which is the type of eliminator that can eliminate or destroy an armor symbol), the gaming system determines that standard eliminator 212*d* at eliminator display position 206*f* does not eliminate armor symbol 216*b* at symbol display position 204*l*. In this example, despite being attacked by standard eliminators 212*c* and 212*d*, the specific attributes of armor symbol 216*b* resulted in armor symbol 216*b* surviving the attack and continuing along the path of symbol display positions.

Following such determinations not to eliminate any symbols, since at least armor symbols 216*a* and 216*b* of the chain of symbols remain non-eliminated and have not reached the ending symbol display position 204*r*, the gaming system advances the chain of symbols one symbol display position. In this example, the gaming system provides appropriate messages such as "THE ARMOR SYMBOL WITHSTOOD THE ATTACK FROM TWO ELIMINATORS AT THE SAME TIME", and "TIME TO MOVE THE CHAIN OF SYMBOLS FURTHER DOWN THE PATH" to the player visually, or through suitable audio or audiovisual displays.

Figure 2I:
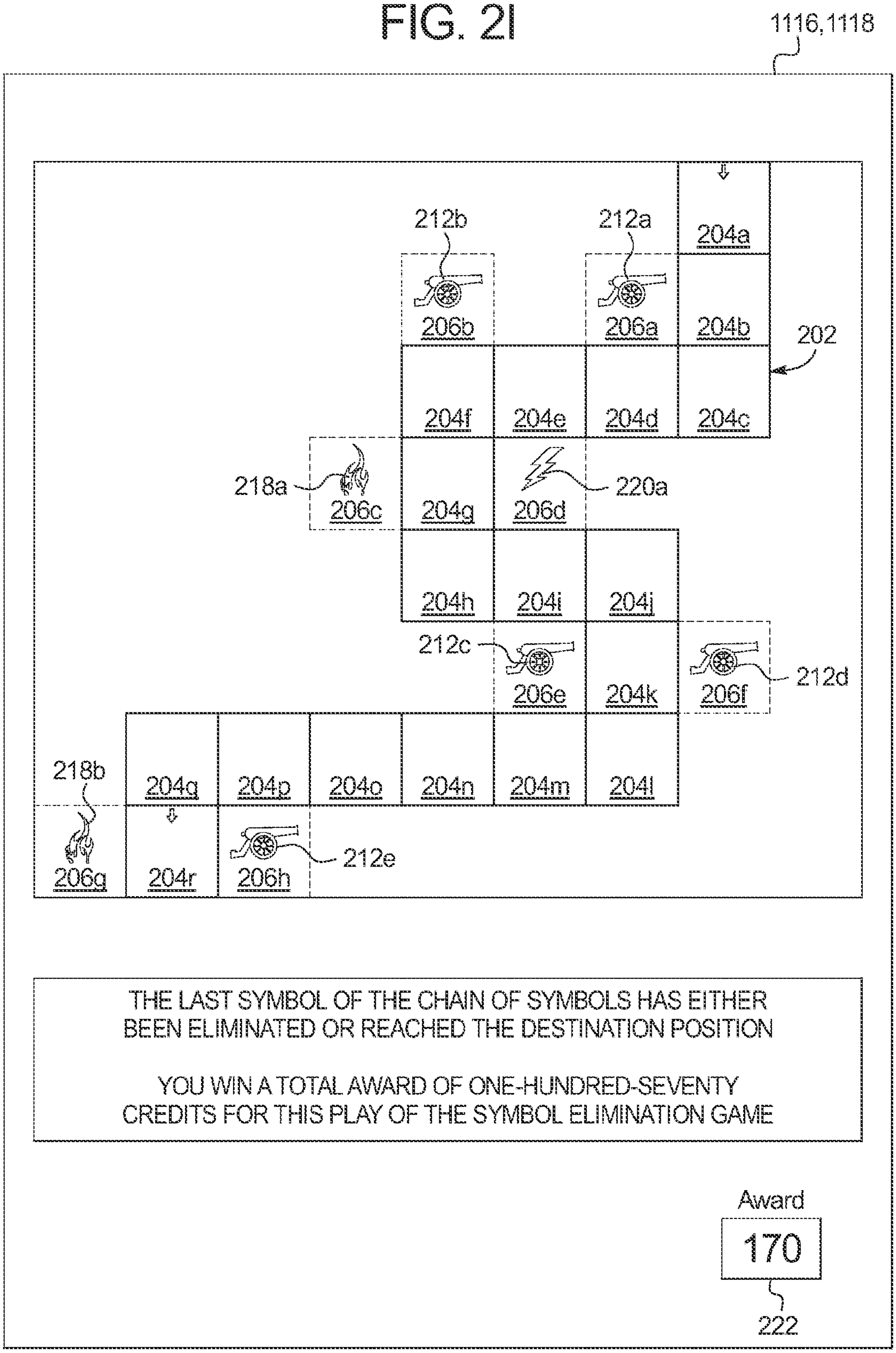

As seen in FIG. 2I, after the chain of symbols has moved or advanced a plurality of symbol display positions toward the ending symbol display position and each of the symbols of the chain of symbols have either been eliminated or have reached ending symbol display position 204*r*, the gaming system terminates the play of the symbol elimination game. In this example, the gaming system provides appropriate messages such as "THE LAST SYMBOL OF THE CHAIN OF SYMBOLS HAS EITHER BEEN ELIMINATED OR REACHED THE DESTINATION POSITION", and "YOU WIN A TOTAL AWARD OF ONE-HUNDRED-SEVENTY CREDITS FOR THIS PLAY OF THE SYMBOL ELIMINATION GAME" to the player visually, or through suitable audio or audiovisual displays.

In one embodiment, the gaming system displays the same path of symbol display positions for a plurality of plays (or each play) of the triggered symbol elimination game. In one such embodiment wherein the gaming system utilizes the same path of symbol display positions for each triggered symbol elimination game, the gaming system utilizes different starting symbol display positions and/or different ending symbol display positions for different plays of the game. In another embodiment, the gaming system randomly selects a path of symbol display positions from a plurality of predefined paths of symbol display positions. In one such embodiment, the predefined paths each have an equal (or substantially equal) probability of being randomly selected. In another such embodiments, different predefined paths have different probabilities of being randomly selected. In another embodiment, for one or more triggered games, the gaming system randomly forms the symbol display position path. In one such embodiment, in addition to randomly forming the path of symbol display positions, the gaming system also randomly determines which symbol display positions of the formed path to utilize as a starting symbol display position and/or an ending symbol display position. In another embodiment, the gaming system enables one or more players to select one or more adjacent symbol display positions to form a path of symbol display positions.

In another embodiment, the gaming system forms a path of symbol display positions with a plurality of starting symbol display positions. In this embodiment, the gaming system randomly determines which of the starting symbol display positions to utilize for a play of a game. In another embodiment, in addition or as an alternative to forming a path of symbol display position with a plurality of starting symbol display positions, the gaming system forms a path of symbol display positions with a plurality of ending symbol display positions. In this embodiment, the gaming system randomly determines which of the ending symbol display positions to utilize for a play of a game. It should be appreciated that in these embodiments, the gaming system's determination of which starting display position and/or which ending symbol display position to utilize determine the direction of movement of the chain of symbols through the path.

In another embodiment, the gaming system determines which end of the chain of symbols to utilize as a leading end. That is, since the chain of symbols includes a symbol at each end, the gaming system determines, for one or more plays of the symbol elimination game, which end of the chain of symbols to use as a leading end (i.e., which end of the chain enters the path of symbol display positions first). It should be appreciated that such a determination affects which symbols are displayed at which symbol display positions of the path at different points in time and thus affects which awards the gaming system provides to the player.

In one embodiment, the gaming system initially displays each of the symbol display positions upon an initiation of the symbol elimination game. In another embodiment, the gaming system initially displays zero, one or more of the symbol display positions upon an initiation of the symbol elimination game and subsequently displays one or more of the symbol display positions as the symbol elimination game progresses.

For example, the gaming system initially conceals the structure of the path of symbol display positions (and/or the eliminator display positions) and displays such symbol display positions (and/or such eliminator display positions) as one or more symbols approach such symbol display positions (and/or such eliminator display positions). Such an embodiment provides an increased level of excitement and anticipation for certain players as such players enjoy the mystery of not knowing where the chain of symbols will move to next.

In another embodiment, the gaming system simultaneously displays a plurality of paths of symbol display positions and a plurality of chains of symbols associated with such paths. In this embodiment, each path of symbol display positions (and the chain of symbols associated with that path) are distinct from each other with no interaction between the paths or symbols of the path. In another embodiment, two or more of the paths (and the chains of symbols associated with such paths) interact with each other. In one such embodiment, the at least two paths overlap such that the gaming system simultaneously displays one or more symbols at each of the paths of symbol display positions. In another such embodiment, the gaming system transfers one or more symbols of one chain of symbols associated with one path to another chain of symbols associated with another path.

In one embodiment, the gaming system displays the same eliminator display positions for a plurality of plays (or each play) of the triggered symbol elimination game. In another embodiment, the gaming system randomly selects one or more eliminator display positions from a plurality of predefined sets of eliminator display positions. In one such embodiment, the predefined sets of eliminator display positions each have an equal (or substantially equal) probability of being randomly selected. In another such embodiments, different predefined sets of eliminator display positions have different probabilities of being randomly selected. In another embodiment, for one or more triggered games, the gaming system randomly places one or more eliminator display positions.

In one embodiment, the gaming system enables one or more players to select one or more eliminator display positions. In one such embodiment, enabling players to place eliminators at different eliminator display positions introduces an element of strategy or skill. In one such embodiment, after a player places one or more eliminators at one or more eliminator display positions, the gaming system randomly determines an award, wherein based on the randomly determined award and the placement and type of eliminators, the gaming system creates a chain of symbols. When the game is played using the created chain of symbols, the resulting award provided to the player will be the randomly determined award.

In another embodiment, the gaming system causes one or more eliminators and/or one or more eliminator display positions to move or switch locations (relative to the path of symbol display positions) as the symbol elimination game is played. In one such embodiment, the gaming system randomly determines a range of awards, wherein based on the randomly determined range of awards, the gaming system creates a chain of symbols. When the game is played using the created chain of symbols, the resulting award provided to the player will be an award selected from the range of awards wherein the selected award is based on any eliminators added to any eliminator display positions (and/or any eliminators which move locations) during the play of the game.

In one embodiment, the gaming system initially displays each of the eliminators at each of the eliminator display positions upon an initiation of the symbol elimination game.

In another embodiment, the gaming system initially displays zero, one or more of the eliminators at zero, one or more of the eliminator display positions upon an initiation of the symbol elimination game and subsequently displays one or more of the eliminators at one or more of the eliminator display positions as the symbol elimination game progresses.

In one embodiment, one or more (or each) eliminator is configured to engage one symbol at a time. In another embodiment, one or more (or each) eliminator is configured to engage a plurality of symbols at a time.

In one embodiment, the gaming system utilizes a predefined chain of symbols wherein each symbol of the chain has a static relationship to each of the other symbols of the chain. In another embodiment, the gaming system randomly determines part or all of the chain of symbols for the play of the symbol elimination game. In one such embodiment, the gaming system randomly generates each symbol prior to displaying that symbol at the starting symbol display position. In another such embodiment, the gaming system randomly generates a plurality of symbols (i.e., a portion of the chain of symbols) prior to displaying any of such symbols at the starting symbol display position.

In one embodiment, as described above, the gaming system removes each eliminated symbol from the chain of symbols. In one such embodiment, zero, one or more of the remaining, non-eliminated symbol move to occupy the empty symbol display position caused by the removal of the eliminated symbol. In this embodiment, such movement may affect whether or not such moved symbols are eliminated. For example, an ice symbol that is about to be engaged and eliminated by a fire eliminator may escape elimination by moving to a symbol display position previously occupied by another symbol of the chain wherein the moved to symbol display position is outside of the engagement range of the fire eliminator. In another embodiment, the gaming system removes each eliminated symbol from the chain of symbols and otherwise maintains the relationship of the remaining symbols of the chain of symbols (i.e., the gaming system does not move any symbols to occupy any empty symbol display positions). In another embodiment, the gaming system designates each eliminated symbol as an eliminated symbol and causes such an eliminated symbol to continue to advance to zero, one or more of the symbol display positions of the path of symbol display positions.

In one embodiment, as described above, any award provided to the player is based on the quantity of symbols of the chain of symbols that are eliminated (i.e., the quantity of symbols that fail to reach the ending symbol display position). In another embodiment, as further described above, any award provided to the player is based on the quantity of symbols of the chain of symbol that reach the ending symbol display position (i.e., the quantity of symbols not eliminated). In one embodiment, one or more paylines of any suitable direction extend through a plurality of symbol display positions, wherein the gaming system determines whether any symbols displayed along such paylines form any winning symbol combinations. In another embodiment, one or more ways to win are associated with a plurality of symbol display positions, wherein the gaming system determines whether any symbols displayed at active symbol display positions form any strings of related symbols. In another embodiment, the gaming system evaluates the symbols of the chain displayed at the symbol display positions in accordance with one or more scatter pay determinations. In another embodiment, the gaming system determines whether any set of similar symbols displayed at adjacent symbol display positions form a winning symbol combination. It should be appreciated that the order or pairings of which symbols are evaluated is based, at least in part, on the configuration of the path of symbol display positions and on which symbols have been eliminated.

In another embodiment, any award provided to the player is based on both the quantity of certain symbols that are eliminated and the quantity of certain symbols that reach the ending symbol display position. In this embodiment, certain symbols are ally or friendly symbols and certain other symbols are enemy symbols, wherein any award provided to the player is based on the quantity of enemy symbols that are eliminated and also the quantity of ally or friendly symbols that reach the ending symbol display position. In one embodiment, the gaming system includes both ally symbols and enemy symbols in the same single chain of symbols which advances along the same, single path of symbol display positions. In another such embodiment, the gaming system includes ally symbols in one chain of symbols and also includes enemy symbols in another chain of symbols. In one embodiment, the chain of ally symbol and the chain of enemy symbols both advance along the same, single path of symbol display positions. In another embodiment, the chain of friendly symbol and the chain of enemy symbols advance along separate paths of symbol display positions.

In another embodiment including enemy symbols and ally symbols, if an eliminator engages an enemy symbol or an ally symbol displayed at a symbol display position associated with that eliminator's eliminator display position, the gaming system causes the eliminator to modify (i.e., increase or decrease) any award value associated with that symbol. For example, the gaming system causes an eliminator to decrease the award value associated with an ally symbol and increase the award value associated with an enemy symbol. In another such embodiment, if an eliminator engages an enemy symbol or an ally symbol displayed at a symbol display position associated with that eliminator's eliminator display position, the gaming system causes the eliminator to modify (i.e., increase or reduce) an amount of any previous damage incurred by that symbol. For example, the gaming system causes an eliminator to increase the amount of previous damage of an ally symbol and decrease the amount of previous damage of an enemy symbol. In another such embodiment, if an eliminator engages an enemy symbol or an ally symbol displayed at a symbol display position associated with that eliminator's eliminator display position, the gaming system causes the eliminator to modify (i.e., increase or decrease) a level of survivability of that symbol (e.g., modify an amount of damage which may be incurred by that symbol before that symbol is eliminated). For example, the gaming system causes an eliminator to decrease the level of survivability an ally symbol and increase the level of survivability of an enemy symbol.

In one embodiment, as described above, the gaming system includes one or more eliminators displayed at one or more eliminator display positions wherein such eliminators destroy or eliminate zero, one or more of the symbols of the chain of symbols. In another embodiment, if an eliminator engages a symbol displayed at a symbol display position associated with that eliminator's eliminator display position, the gaming system causes the eliminator to decrease any award value associated with that symbol.

In another embodiment, the gaming system includes one or more enhancers displayed at one or more enhancer display positions. In one such embodiment, if an enhancer engages a symbol displayed at a symbol display position associated with that enhancer's enhancer display position, the gaming system causes the enhancer to modify (i.e., increase or decrease) any award value associated with that symbol. In another such embodiment, if an enhancer engages a symbol displayed at a symbol display position associated with that enhancer's enhancer display position, the gaming system causes the enhancer to modify (i.e., increase or reduce) an amount of any previous damage incurred by that symbol. In another such embodiment, if an enhancer engages a symbol displayed at a symbol display position associated with that enhancer's enhancer display position, the gaming system causes the enhancer to modify (i.e., increase or decrease) a level of survivability of that symbol (e.g., modify an amount of damage which may be incurred by that symbol before that symbol is eliminated). In another such embodiment, if an enhancer engages a symbol displayed at a symbol display position associated with that enhancer's enhancer display position, the gaming system causes the enhancer to designate that symbol as a non-eliminated symbol for the remainder of the play of the symbol elimination game (i.e., the enhancer prevents that symbol from subsequently being eliminated for the play of the game).

In another embodiment including eliminators, enhancers, enemy symbols and ally symbols, if an enhancer engages an enemy symbol or an ally symbol displayed at a symbol display position associated with that enhancer's enhancer display position, the gaming system causes the enhancer to modify (i.e., increase or decrease) any award value associated with that symbol. For example, the gaming system causes an enhancer to increase the award value associated with an ally symbol and decrease the award value associated with an enemy symbol. In another such embodiment, if an enhancer engages an enemy symbol or an ally symbol displayed at a symbol display position associated with that enhancer's enhancer display position, the gaming system causes the enhancer to modify (i.e., increase or reduce) an amount of any previous damage incurred by that symbol. For example, the gaming system causes an enhancer to decrease the amount of previous damage of an ally symbol and increase the amount of previous damage of an enemy symbol. In another such embodiment, if an enhancer engages an enemy symbol or an ally symbol displayed at a symbol display position associated with that enhancer's enhancer display position, the gaming system causes the enhancer to modify (i.e., increase or decrease) a level of survivability of that symbol (e.g., increase an amount of damage which may be incurred by that symbol before that symbol is eliminated). For example, the gaming system causes an enhancer to increase the level of survivability an ally symbol and decrease the level of survivability of an enemy symbol. In another such embodiment, if an enhancer engages an enemy symbol or an ally symbol displayed at a symbol display position associated with that enhancer's enhancer display position, the gaming system causes the enhancer to designate that symbol as a non-eliminated symbol for the remainder of the play of the symbol elimination game (i.e., the enhancer prevents that symbol from subsequently being eliminated for the play of the game).

In one embodiment, as described above, the gaming system moves the chain of symbols through the symbol display positions of the path until after either each of the symbols of the chain of symbols have been eliminated or have reached the ending symbol display position. In another embodiment, the gaming system moves the chain of symbols through the symbol display positions of the path until the first displayed symbol in the chain reaches the ending symbol display position (or reaches a designated symbol display position having a predetermined relationship to the ending symbol display position). In another embodiment, the gaming system moves the chain of symbols through the symbol display positions of the path until a designated displayed symbol in the chain, such as the fifteenth displayed symbol in the chain, reaches the ending symbol display position (or reaches a designated symbol display position having a predetermined relationship to the ending symbol display position). In another embodiment, the gaming system moves the chain of symbols through the symbol display positions of the path until a designated period of time has elapsed. In another embodiment, the gaming system stops the symbols moving to correspond with a randomly generated game outcome. In another embodiment, the gaming system moves the chain of symbols through the path of symbol display positions such that at least one of the symbol display positions does not display any symbol when the gaming system stops the chain of symbols. In another embodiment, the gaming system moves the chain of symbols through the path of symbol display positions until a quantity of symbols has been destroyed.

In another embodiment, the gaming system stops the symbols moving in association with one or more inputs from the player, such as a stop symbol movement input from the player. In this embodiment, if the player does not make the necessary input(s) in a designated period of time to stop the movement of the chain of symbols, the gaming system stops the movement of the chain of symbols through the symbol display positions of the formed path. Thus, this embodiment employs one or more aspects of player skill in determining when to stop the chain of symbol's movement and thus this embodiment employs one or more aspects of player skill in determining the outcome (and any associated award) of the symbol elimination game disclosed herein. That is, because the path of symbol display positions includes each of the displayed symbol display positions, the player can see the entire window of symbols updating as the chain of symbols moves through the path of symbol display positions. Accordingly, the player analyzes the window of symbols, and prior to the player's time being up and the gaming system stopping the movement of the chain, the player decides when to stop the chain of symbols when the player believes the symbols displayed along the path of symbol display positions (i.e., the symbols currently displayed in the window of symbols) correspond to a favorable outcome.

In another embodiment, the gaming system enables the player to make one or more designated inputs to determine the direction of movement of the chain of symbols. In one such embodiment, the gaming system enables the player to make a plurality of inputs regarding the direction of movement of the chain of symbols during the same play of the game. For example, the gaming system enables the player to move the chain of symbols toward the ending symbol display position (i.e., forward) and away from the ending symbol display position (i.e., in reverse) one or more times during the play of the game. This embodiment, combined with the above-described embodiment which enables the player to determine when to stop the movement of the chain of symbols, enables the player to utilize a degree of play skill.

In another embodiment, one or more of the symbol display positions of the path cause a modification to the symbols of the chain which pass through such symbol display positions. In one such embodiment, a designated symbol display position causes each symbol of the chain (which is located at that symbol display position) to be associated with a higher award value if that symbol is eliminated (or in an alternative embodiment, if that symbol is not eliminated and reaches the ending symbol display position). In another such embodiment, a designated symbol display position displays each symbol of the chain (which is located at that symbol display position) as a wild symbol. In another such embodiment, a designated symbol display position displays each symbol of the chain (which is located at that symbol display position) as a bonus symbol. In one another embodiment, a designated symbol display position displays each symbol of the chain (which is located at that symbol display position) as a modifier symbol (e.g., a multiplier symbol).

In another embodiment wherein one or more of the symbol display positions of the path cause a modification to the symbols of the chain which pass through such symbol display positions, the modification of such symbols is a static modification which does not change from play to play of the game. In another embodiment wherein one or more of the symbol display positions of the path cause a modification to the symbols of the chain which pass through such symbol display positions, the gaming system randomly determines which of a plurality of modifications to apply to such symbols.

In another embodiment, one or more of the symbol display positions of the path are associated with designated symbols of the chain. In this embodiment, if a symbol display position of the path displays a designated symbol (which is associated with that symbol display position), the gaming system triggers one or more features. For example, if the gaming system advances the chain of symbols such that a specific symbol display position displays a specific symbol, the gaming system triggers a bonus game.

In another embodiment, the gaming system randomly modifies the quantity of symbol display positions in the path. In one such embodiment, upon a path modification event occurring, the gaming system increases the quantity of symbol display positions of the path. Such a modification increases the quantity of symbols of the chain which are displayed to the player at any point in time and thus increases the chances of the player winning one or more awards in association with the elimination (or alternative in association with the survival) of that symbol.

In one embodiment, the gaming system provides a group gaming aspect to the symbol elimination game disclosed herein. In one such embodiment, the symbol elimination game is a cooperative community game wherein a plurality of players cooperate or play together to win one or more awards. In another such embodiment, the symbol elimination game is a competition community game wherein a plurality of players compete or player against each other to win one or more awards.

In one embodiment wherein the symbol elimination game is a cooperative community game, the gaming system provides, to each of the players (or to a plurality of the players) of the community game, the award associated with the quantity of symbols of the chain of symbols that are eliminated. In another such embodiment wherein the symbol elimination game is a cooperative community game, the gaming system provides, to each of the players (or to a plurality of the players) of the community game, the award associated with the quantity of symbols of the chain of symbol that reach the ending symbol display position.

In one embodiment wherein the symbol elimination game is a cooperative community game and the gaming system enables one or more players to place eliminators at one or more eliminator display positions, the gaming system provides a group award to each of (or a plurality of) the players of the community game for any symbols eliminated by a placed eliminator. In this embodiment, the gaming system rewards the group of players for one player's correct decision in where to place an eliminator. In another embodiment wherein the symbol elimination game is a cooperative community game and the gaming system enables one or more players to place enhancers at one or more enhancer display positions, the gaming system provides a group award to each of (or a plurality of) the players of the community game for any symbols enhanced by a placed enhancer. In this embodiment, the gaming system rewards the group of players for one player's correct decision in where to place an enhancer. In another embodiment wherein the symbol elimination game is a cooperative community game, the gaming system enables one or more players to place eliminators at one or more eliminator display positions and the gaming system further enables one or more players to place enhancers at one or more enhancer display positions, the gaming system provides a group award to the players of the community game for any symbols eliminated by a placed eliminator and the gaming system further provides a group award to the players of the community game for any symbols enhanced by a placed enhancer.

In another embodiment wherein the symbol elimination game is a cooperative community game, the chain of symbols includes ally symbols and enemy symbols and the gaming system enables one or more players to place eliminators at one or more eliminator display positions, the gaming system provides awards to the players of the community game based on the quantity of enemy symbols that are eliminated and/or based on the quantity of ally symbols that are not eliminated. In another embodiment wherein the symbol elimination game is a cooperative community game, the chain of symbols includes ally symbols and enemy symbols, the gaming system enables one or more players to place eliminators at one or more eliminator display positions, and the gaming system enables one or more players to place enhancers at one or more enhancer display positions, the gaming system provides awards to the players of the community game based on the quantity of enemy symbols that are eliminated and/or based on the quantity of ally symbols that are not eliminated (and/or enhanced).

In one embodiment wherein the symbol elimination game is a competitive community game, the gaming system provides an award to one or more (but not each of) a plurality of players, wherein the award is based on the quantity of symbols of the chain of symbols that are eliminated. In another such embodiment wherein the symbol elimination game is a competitive community game, the gaming system provides an award to one or more (but not each of) a plurality of players, wherein the award is based on the quantity of symbols of the chain of symbol that reach the ending symbol display position.

In one embodiment wherein the symbol elimination game is a competitive community game and the gaming system enables one or more players to place eliminators at one or more eliminator display positions, for any symbols eliminated by a placed eliminator, the gaming system provides an individual award to the individual player that placed the eliminator that subsequently eliminated a symbol. In another embodiment wherein the symbol elimination game is a competitive community game and the gaming system enables one or more players to place enhancers at one or more enhancer display positions, for any symbols enhanced by a placed enhancer, the gaming system provides an individual award to the individual player that placed the enhancer that subsequently enhanced a symbol. In another embodiment wherein the symbol elimination game is a competitive community game, the gaming system enables one or more players to place eliminators at one or more eliminator display positions and the gaming system further enables one or more players to place enhancers at one or more enhancer display positions, for any symbols eliminated by a placed eliminator that subsequently eliminated a symbol, the gaming system provides an individual award to the individual player that placed the eliminator and for any symbols enhanced by a placed enhancer, the gaming system provides an individual award to the individual player that placed the enhancer that subsequently enhanced a symbol.

In another embodiment wherein the symbol elimination game is a competitive community game, the chain of symbols includes ally symbols and enemy symbols and the gaming system enables one or more players to place eliminators at one or more eliminator display positions, for each enemy symbol eliminated, the gaming system provides an individual award to the individual player that placed the eliminator that eliminated that enemy symbol. In another embodiment wherein the symbol elimination game is a competitive community game, the chain of symbols includes ally symbols and enemy symbols, the gaming system enables one or more players to place eliminators at one or more eliminator display positions, and the gaming system enables one or more players to place enhancers at one or more enhancer display positions, the gaming system provides awards to the individual players of the community game based on which of the player's placed eliminators and/or placed enhancers engaged and subsequently eliminated and/or enhanced the enemy symbols and/or the ally symbols of the chain of symbols.

In another embodiment wherein the symbol elimination game is a competitive community game, the chain of symbols includes ally symbols and enemy symbols associated with individual players of the community game. That is, a first player of the community game is associated with a quantity of ally symbols of the chain of symbols and a quantity of enemy symbols of the chain of symbols and a second player of the community game is associated with a quantity of ally symbols of the chain of symbols and a quantity of enemy symbols of the chain of symbols. In this embodiment, for each eliminated enemy symbol associated with an individual player, the gaming system provides an individual award to that player for the eliminated enemy symbol. Additionally or alternatively, for each non-eliminated ally symbol associated with an individual player, the gaming system provides an individual award to that player for the non-eliminated ally symbol that reaches the destination symbol display position.

In one embodiment, the gaming system causes at least one display device of the player's gaming device to display the symbol elimination game. In another embodiment, in addition or in alternative to each gaming device displaying the symbol elimination game, the gaming system causes one or more community or overhead display devices to display part or all of the symbol elimination game to one or more other players or bystanders either at a gaming establishment or viewing over a network, such as the internet. In another embodiment, the gaming system displays the symbols moving across the display devices of multiple adjacent gaming devices. In different embodiments, the gaming system determines one or more bonus awards based on such multi-gaming device moving symbols, such as a bonus award based on a sum total of each eliminated symbol which moved across the display devices of multiple gaming devices or a bonus award based on an accumulated quantity of non-eliminated symbols across the display devices of multiple gaming machines.

In another embodiment, in addition or in alternative to each gaming device displaying the symbol elimination game, the gaming system causes one or more internet sites to each display the symbol elimination game such that a player is enabled to log on from a personal web browser. In another such embodiment, the gaming system enables the player to play one or more primary games on one device while viewing the symbol elimination game from another device. For example, the gaming system enables the player to play one or more primary games on a mobile phone while viewing the status of the symbol elimination game on a desktop or laptop computer.

In another embodiment, as mentioned above, a symbol elimination game triggering event occurs, based on an outcome associated with one or more plays of any primary game and/or an outcome associated with one or more plays of any secondary game of the gaming devices in the gaming system. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes a symbol elimination game triggering event to occur.

In another embodiment, as also mentioned above, the gaming system does not provide any apparent reasons to the players for a symbol elimination game triggering event to occur. In these embodiments, such determinations are not triggered by an event in a primary game or based specifically on any of the plays of any primary game or on any of the plays of any secondary game of the gaming devices in the system. That is, these events occur without any explanation or alternatively with simple explanations.

In one embodiment, a symbol elimination game triggering event occurs, based on an amount coin-in. In this embodiment, the gaming system determines if an amount of coin-in wagered at one or more gaming devices in the gaming system reaches or exceeds a designated amount of coin-in (i.e., a threshold coin-in amount). Upon the amount of coin-in wagered at one or more gaming devices in the gaming system reaching or exceeding the bonus threshold coin-in amount, the gaming system causes one or more of such events or conditions to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a symbol elimination game triggering event occurs, based on an amount coin-out. In this embodiment, the gaming system determines if an amount of coin-out provided by one or more gaming devices in the gaming system reaches or exceeds a designated amount of coin-out (i.e., a threshold coin-out amount). Upon the amount of coin-out provided at one or more gaming devices in the gaming system reaching or exceeding the threshold coin-out amount, the gaming system causes one or more of such events or conditions to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a symbol elimination game triggering event occurs, based on a predefined variable reaching a defined parameter threshold. For example, when the 500,000$^{th}$ player has played a gaming device of the gaming system (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute $250,000), a number of gaming devices active, or any other parameter that defines a suitable threshold.

In another alternative embodiment, a symbol elimination game triggering event occurs, based on a quantity of games played. In this embodiment, a quantity of games played is set for when one or more of such events or conditions will occur. In one embodiment, such a set quantity of games played is based on historic data.

In another alternative embodiment, a symbol elimination game triggering event occurs, based on time. In this embodiment, a time is set for when one or more of such events or conditions will occur. In one embodiment, such a set time is based on historic data.

In another alternative embodiment, a symbol elimination game triggering event occurs, based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In another alternative embodiment, a symbol elimination game triggering event occurs, based on a system determination, including one or more random selections by the central controller. In one embodiment, as described above, the central controller tracks all active gaming devices and the wagers they placed. In one such embodiment, based on the gaming device's state as well as one or more wager pools associated with the gaming device, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In another alternative embodiment, a symbol elimination game triggering event occurs, based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a symbol elimination game triggering event to occur may be implemented in accordance with the gaming system and method disclosed herein.

It should be appreciated that any of the above-described symbol elimination game triggering events may be combined in one or more different embodiments.

Alternative Embodiments

It should be appreciated that in different embodiments, one or more of:

i. a quantity of symbol display positions in a formed path;
ii. a formation of a path of symbol display positions;
iii. which path of symbol display positions to display;
iv. a shape or configuration of the path of symbol display positions;
v. a quantify of formed paths of symbol display positions;
vi. a quantity of symbols simultaneously or overlappingly displayed by one or more of the symbol display positions;
vii. a direction of movement of the chain of symbols through the path;
viii. a speed which to move the chain of symbols through the path;
ix. which symbol display position of the path will function as a starting symbol display position;
x. which symbol display position of the path will function as a ending symbol display position;
xi. a quantity of eliminator display positions associated with the symbol display positions of a formed path;
xii. a location of one or more eliminator display positions;
xiii. which symbol display positions of the path are associated with which eliminator display positions;
xiv. which eliminators have which attributes;
xv. a quantity of attributes one or more eliminators have;
xvi. a quantity of symbols of the chain of symbols;
xvii. which symbols have which attributes;
xviii. a quantity of attributes one or more symbols have;
xix. a quantity of chains of symbols;
xx. whether an eliminator engages a symbol;
xxi. a quantity of symbols an eliminator engages at once;
xxii. a quantity of symbols that an eliminator engages over a designated period of time;
xxiii. a frequency which an eliminator engages one or more symbols;
xxiv. a range of symbol display positions an eliminator at an eliminator display position engages a symbol at;
xxv. whether an eliminator eliminates a symbol;
xxvi. a quantity of symbols an eliminator eliminates at once;
xxvii. a quantity of symbols an eliminator eliminates over a designated period of time;
xxviii. whether an eliminator damages, but does not destroy, a symbol;
xxix. a quantity of symbols an eliminator damages at once;
xxx. a quantity of symbols an eliminator damages over a designated period of time;
xxxi. a quantity of enhancer display positions associated with the symbol display positions of a formed path;
xxxii. a location of one or more enhancer display positions;
xxxiii. which symbol display positions of the path are associated with which enhancer display positions;
xxxiv. whether an enhancer engages a symbol;
xxxv. a quantity of symbols an enhancer engages at once;
xxxvi. a quantity of symbols that an enhancer engages over a designated period of time;
xxxvii. a frequency which an enhancer engages one or more symbols;
xxxviii. a range of symbol display positions an enhancer at an enhancer display position engages a symbol at;
xxxix. whether an enhancer enhances a symbol;
xl. a quantity of symbols an enhancer enhances at once;
xli. a quantity of symbols an enhancer enhances over a designated period of time;
xlii. a quantity of enemy symbols in one or more chains of symbols;
xliii. a quantity of ally symbols in one or more chain of symbols;
xliv. which attributes are associated with which ally symbols;
xlv. which attributes are associated with which enemy symbols;
xlvi. whether to enable a player to make any inputs to stop the movement of the chain of symbols through the path;
xlvii. whether to enable a player to make any inputs to change the direction of movement of the chain of symbols through the path;
xlviii. a quantity of any symbol display positions of the path that modify the symbols displayed at or which pass through such symbol display positions;
xlix. which of any symbol display positions of the path modify the symbols displayed at or which pass through such symbol display positions;
l. whether to modify the quantity of symbol display positions of the path (i.e., whether a path modification event occurs);
li. a quantity of symbol display positions of the path to add or subtract;
lii. which symbols of the chain are associated with which symbol display positions of the path; and
liii. any determination disclosed herein;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a “gaming system” as used herein refers to various configurations of: (a) one or more central servers, central controllers, or remote hosts; (b) one or more electronic gaming machines (“EGMs”); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an “EGM.” Additionally, for brevity and clarity, unless specifically stated otherwise, “EGM” as used herein represents one EGM or a plurality of EGMs, and “central server, central controller, or remote host” as used herein represents one central server, central controller, or remote host or a plurality of central servers, central controllers, or remote hosts.

Figure 3A:
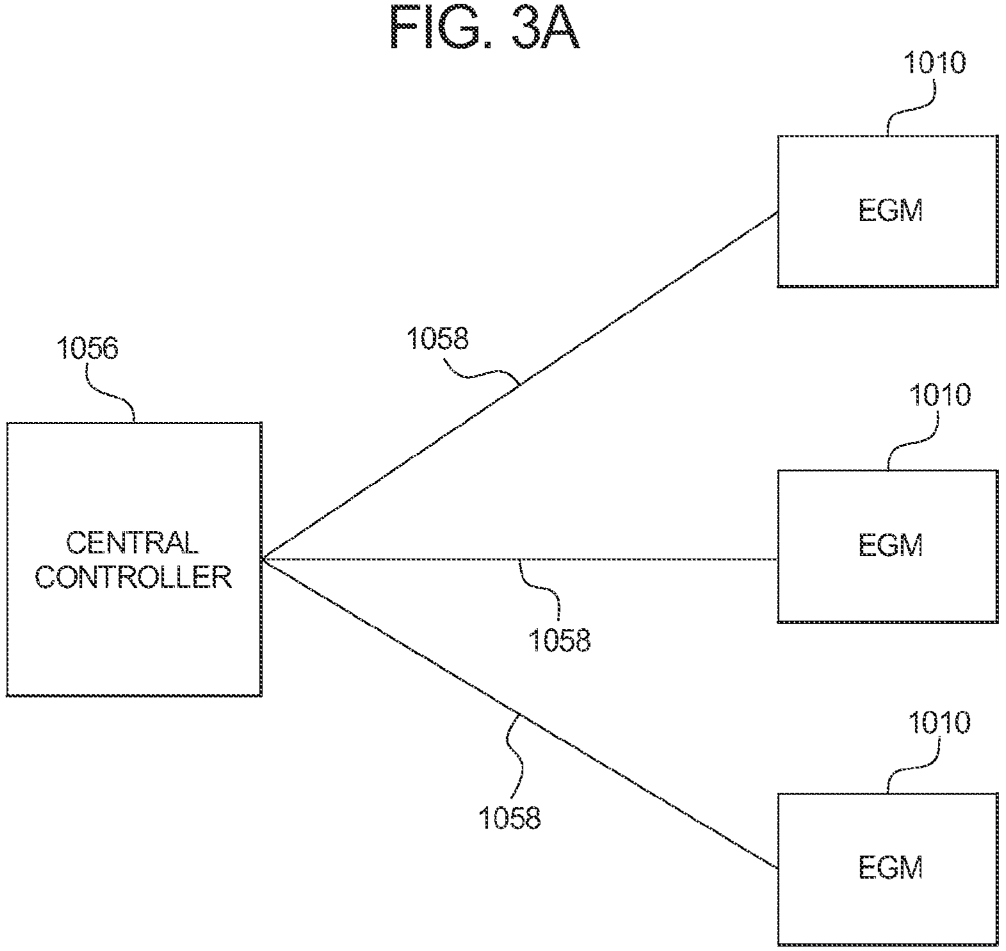
FIG. 3A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such “thin client” embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such “thick client” embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
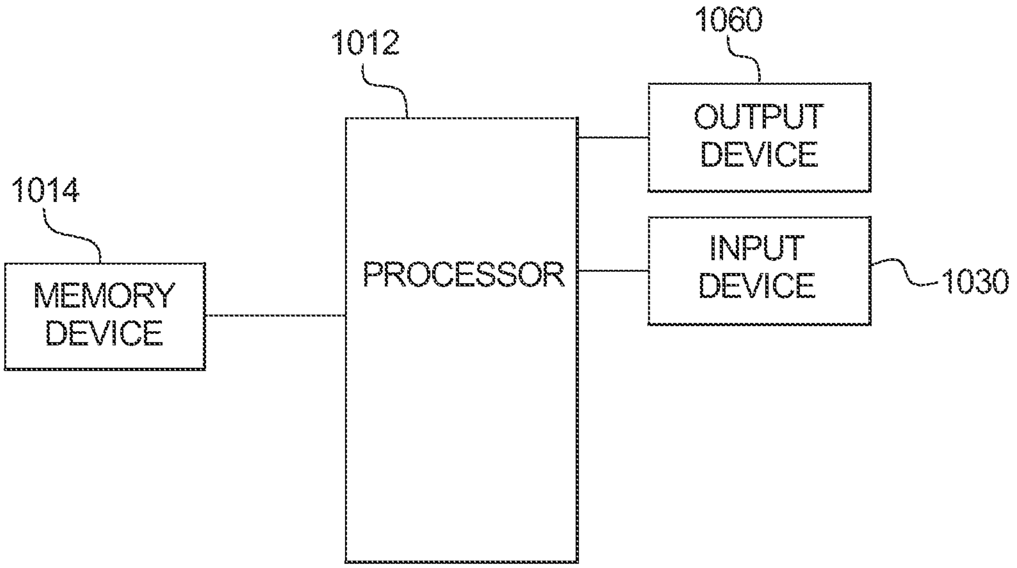
FIG. 3B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
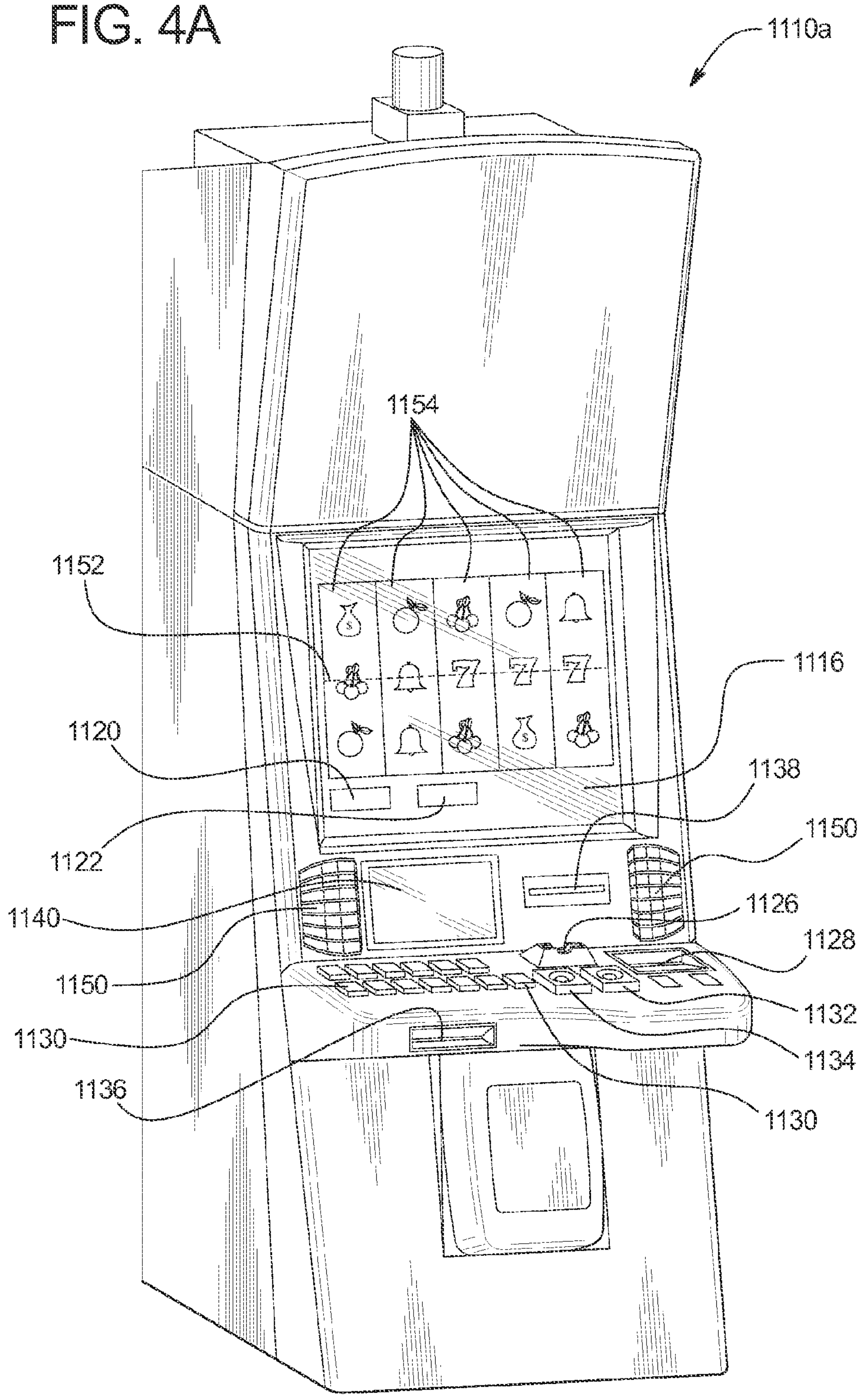
FIGS. 4A and 4B are perspective views of example alternative embodiments of the gaming system disclosed herein.
Figure 4B:
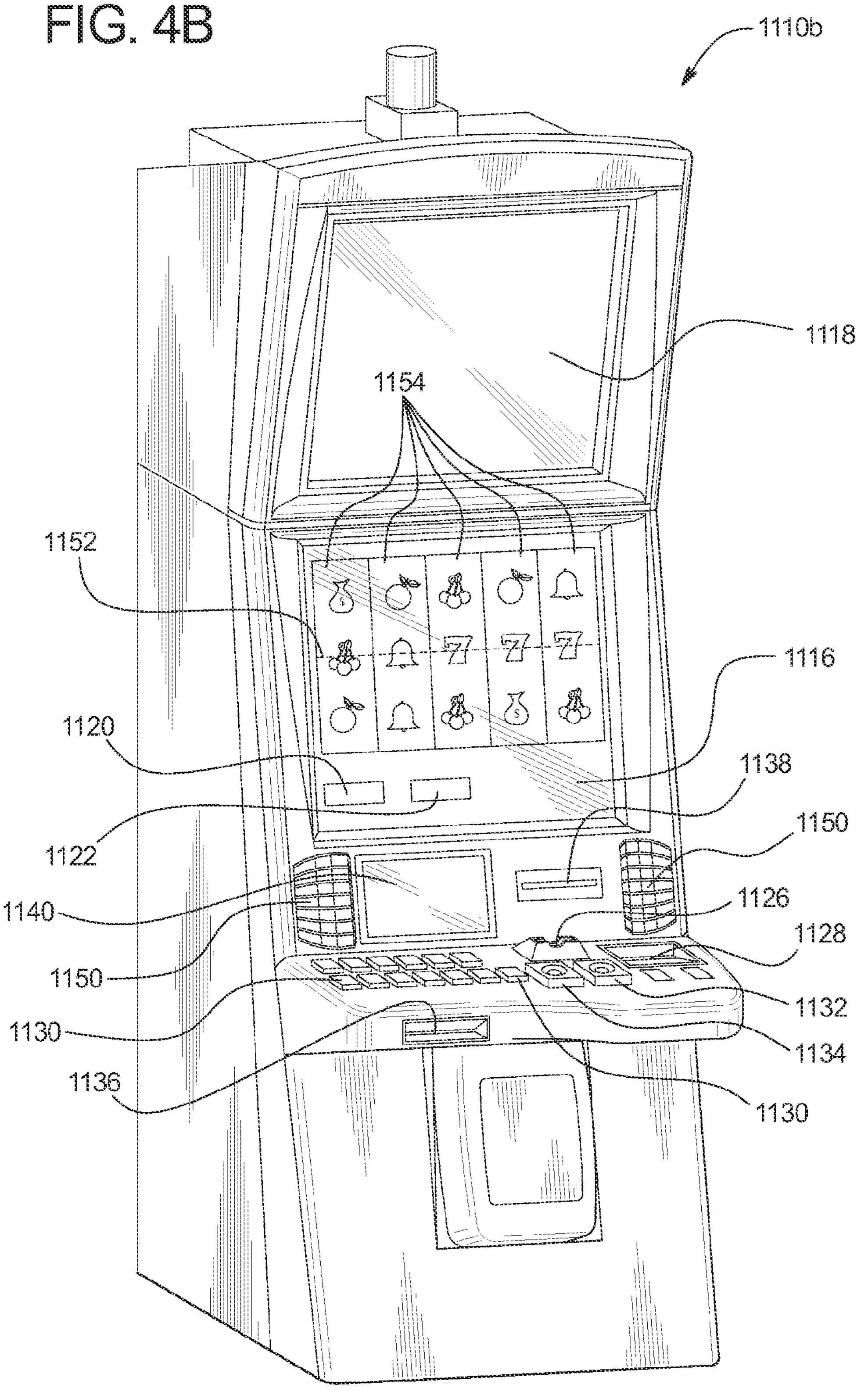

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 4A and 4B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a plurality of gaming devices, each gaming device including:
- at least one display device, and
- at least one input device; and a controller configured to communicate with each of the gaming devices, for a play of a cooperative community game, said gaming devices and said controller programmed to:
- (a) display:
  - (i) a path of a plurality of symbol display positions, said path associated with a single chain of symbols including a plurality of different symbols having a plurality of different symbol attributes, and
  - (ii) at least one of the symbols at at least one of the symbol display positions,
- (b) enable at least one player of at least one of the gaming devices to make at least one input to place at least one of a plurality of different eliminators at at least one eliminator display position, said plurality of different eliminators having a plurality of different eliminator attributes and each eliminator display position being associated with at least one of the symbol display positions,
- (c) if any of the symbols are displayed at any of the symbol display positions associated with any of the eliminator display positions, for each symbol displayed at each symbol display position associated with at least one of the eliminator display positions, determine if the eliminator displayed at the eliminator display position eliminates the symbol displayed at the associated symbol display position, said determination being based on the symbol attribute of the symbol and the eliminator attribute of the eliminator,
- (d) determine an award based on a quantity of eliminated symbols,
- (e) display the determined award, and
- (f) cause a plurality of the gaming devices to each provide at least part of the determined award.

2. The gaming system of claim 1, wherein said gaming devices and said controller are programmed to:
- display the single chain of symbols incrementally moving through the path of symbol display positions, and
- each time the single chain of symbols stops moving, if any of the symbols are displayed at any of the symbol display positions associated with any of the eliminator display positions, for each symbol displayed at each symbol display position associated with at least one of the eliminator display positions, determine if the eliminator displayed at the eliminator display position eliminates the symbol displayed at the associated symbol display position, said determination being based on the symbol attribute of the symbol and the eliminator attribute of the eliminator.

3. The gaming system of claim 2, wherein said gaming devices and said controller are programmed to cause the plurality of gaming devices to each provide the at least part of the determined award when one of: each of the symbols are eliminated and each of any non-eliminated symbols move to a designated one of the symbol display positions.

4. The gaming system of claim 1, wherein said gaming devices and said controller are programmed to enable a plurality of players to each make at least one input to place at least one of the plurality of different eliminators at at least one of the eliminator display positions.

5. The gaming system of claim 1, wherein a first quantity of eliminated symbols is associated with a first award and a second, higher quantity of eliminated symbols is associated with a second, higher award.

6. The gaming system of claim 1, wherein a first quantity of eliminated symbols is associated with a first award and a second, higher quantity of eliminated symbols is associated with a second, lower award.

7. The gaming system of claim 1, wherein the award is at least one selected from the group consisting of: a quantity of monetary credits, a quantity of non-monetary credits, a quantity of promotional credits, and a quantity of player tracking points.

8. A gaming system comprising:

a plurality of gaming devices, each gaming device including:

at least one display device, and at least one input device; and a controller configured to communicate with each of the gaming devices, for a play of a competitive community game, said gaming devices and said controller programmed to:

(a) display:

(i) a path of a plurality of symbol display positions, said path associated with a single chain of symbols including a plurality of different symbols having a plurality of different symbol attributes, and (ii) at least one of the symbols at at least one of the symbol display positions, (b) enable each of a plurality of players at each of a plurality of the gaming devices to make at least one input to place at least one of a plurality of different eliminators at at least one eliminator display position, said plurality of different eliminators having a plurality of different eliminator attributes and each eliminator display position being associated with at least one of the symbol display positions, (c) if any of the symbols are displayed at any of the symbol display positions associated with any of the eliminator display positions, for each symbol displayed at each symbol display position associated with at least one of the eliminator display positions, determine if the eliminator displayed at the eliminator display position eliminates the symbol displayed at the associated symbol display position, said determination being based on the symbol attribute of the symbol and the eliminator attribute of the eliminator, and (d) for each eliminated symbol:

(i) determine an award, (ii) display the determined award, and (iii) cause the gaming device played by the player that placed the eliminator that eliminated the symbol to provide the determined award to the player.

9. The gaming system of claim 8, wherein said gaming devices and said controller are programmed to:

display the single chain of symbols incrementally moving through the path of symbol display positions, and each time the single chain of symbols stops moving, if any of the symbols are displayed at any of the symbol display positions associated with any of the eliminator display positions, for each symbol displayed at each symbol display position associated with at least one of the eliminator display positions, determine if the eliminator displayed at the eliminator display position eliminates the symbol displayed at the associated symbol display position, said determination being based on the symbol attribute of the symbol and the eliminator attribute of the eliminator.

10. The gaming system of claim 8, wherein for each eliminated symbol, said gaming devices and said controller are programmed to determine the award at least partially based on the symbol attribute of said eliminated symbol.

11. The gaming system of claim 8, wherein the award is at least one selected from the group consisting of: a quantity of monetary credits, a quantity of non-monetary credits, a quantity of promotional credits, and a quantity of player tracking points.

12. A method of operating a gaming system, said method comprising:

(a) for a play of a cooperative community game, causing at least one display device to display:

(i) a path of a plurality of symbol display positions, said path associated with a single chain of symbols including a plurality of different symbols having a plurality of different symbol attributes, and (ii) at least one of the symbols at at least one of the symbol display positions, (b) enabling at least one player of at least one of a plurality of gaming devices to make at least one input to place at least one of a plurality of different eliminators at at least one eliminator display position, said plurality of different eliminators having a plurality of different eliminator attributes and each eliminator display position being associated with at least one of the symbol display positions, (c) if any of the symbols are displayed at any of the symbol display positions associated with any of the eliminator display positions, for each symbol displayed at each symbol display position associated with at least one of the eliminator display positions, causing at least one processor to execute a plurality of instructions to determine if the eliminator displayed at the eliminator display position eliminates the symbol displayed at the associated symbol display position, said determination being based on the symbol attribute of the symbol and the eliminator attribute of the eliminator, (d) causing the at least one processor to execute the plurality of instructions to determine an award based on a quantity of eliminated symbols, (e) causing the at least one display device to display the determined award, and (f) causing a plurality of the gaming devices to each provide at least part of the determined award.

13. The method of claim 12, which includes:

causing the at least one display device to display the single chain of symbols incrementally moving through the path of symbol display positions, and each time the single chain of symbols stops moving, if any of the symbols are displayed at any of the symbol display positions associated with any of the eliminator display positions, for each symbol displayed at each symbol display position associated with at least one of the eliminator display positions, causing the at least one processor to execute the plurality of instructions to determine if the eliminator displayed at the eliminator display position eliminates the symbol displayed at the associated symbol display position, said determination being based on the symbol attribute of the symbol and the eliminator attribute of the eliminator.

14. The method of claim 13, which includes causing the plurality of gaming devices to each provide the at least part of the determined award when one of: each of the symbols are eliminated and each of any non-eliminated symbols move to a designated one of the symbol display positions.

15. The method of claim 12, which includes enabling a plurality of players to each make at least one input to place at least one of the plurality of different eliminators at at least one of the eliminator display positions.

16. The method of claim 12, wherein a first quantity of eliminated symbols is associated with a first award and a second, higher quantity of eliminated symbols is associated with a second, higher award.

17. The method of claim 12, wherein a first quantity of eliminated symbols is associated with a first award and a second, higher quantity of eliminated symbols is associated with a second, lower award.

18. The method of claim 12, wherein the award is at least one selected from the group consisting of: a quantity of monetary credits, a quantity of non-monetary credits, a quantity of promotional credits, and a quantity of player tracking points.

19. The method of claim 12, which is provided through a data network.

20. The method of claim 19, wherein the data network is the internet.

21. A method of operating a gaming system, said method comprising:

(a) for a play of a competitive community game, causing at least one display device to display:

(i) a path of a plurality of symbol display positions, said path associated with a single chain of symbols including a plurality of different symbols having a plurality of different symbol attributes, and (ii) at least one of the symbols at at least one of the symbol display positions, (b) enabling each of a plurality of players at each of a plurality gaming devices to make at least one input to place at least one of a plurality of different eliminators at at least one eliminator display position, said plurality of different eliminators having a plurality of different eliminator attributes and each eliminator display position being associated with at least one of the symbol display positions, (c) if any of the symbols are displayed at any of the symbol display positions associated with any of the eliminator display positions, for each symbol displayed at each symbol display position associated with at least one of the eliminator display positions, causing at least one processor to execute a plurality of instructions to determine if the eliminator displayed at the eliminator display position eliminates the symbol displayed at the associated symbol display position, said determination being based on the symbol attribute of the symbol and the eliminator attribute of the eliminator, and (d) for each eliminated symbol:

(i) causing the at least one processor to execute the plurality of instructions to determine an award, (ii) causing the at least one display device to display the determined award, and (iii) causing the gaming device played by the player that placed the eliminator that eliminated the symbol to provide the determined award to the player.

22. The method of claim 21, which includes:

causing the at least one display device to display the single chain of symbols incrementally moving through the path of symbol display positions, and each time the single chain of symbols stops moving, if any of the symbols are displayed at any of the symbol display positions associated with any of the eliminator display positions, for each symbol displayed at each symbol display position associated with at least one of the eliminator display positions, causing the at least one processor to execute the plurality of instructions to determine if the eliminator displayed at the eliminator display position eliminates the symbol displayed at the associated symbol display position, said determination being based on the symbol attribute of the symbol and the eliminator attribute of the eliminator.

23. The method of claim 21, which includes, for each eliminated symbol, causing the at least one processor to execute the plurality of instructions to determine the award at least partially based on the symbol attribute of said eliminated symbol.

24. The method of claim 21, wherein the award is at least one selected from the group consisting of: a quantity of monetary credits, a quantity of non-monetary credits, a quantity of promotional credits, and a quantity of player tracking points.

25. The method of claim 21, which is provided through a data network.

26. The method of claim 25, wherein the data network is the internet.

* * * * *